US011955648B2

(12) United States Patent
Oh et al.

(10) Patent No.: US 11,955,648 B2
(45) Date of Patent: Apr. 9, 2024

(54) POUCH-TYPE BATTERY CASE, APPARATUS FOR FORMING SAME, AND POUCH-TYPE SECONDARY BATTERY

(71) Applicant: LG Energy Solution, Ltd., Seoul (KR)

(72) Inventors: Se Young Oh, Daejeon (KR); Jeong Min Ha, Daejeon (KR); Sang Hun Kim, Daejeon (KR); Sin Woong Kim, Daejeon (KR); Geun Hee Kim, Daejeon (KR); Hyun Beom Kim, Daejeon (KR); Hyung Ho Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 282 days.

(21) Appl. No.: 17/569,826

(22) Filed: Jan. 6, 2022

(65) Prior Publication Data

US 2022/0320634 A1    Oct. 6, 2022

(30) Foreign Application Priority Data

Mar. 30, 2021   (KR) ........................ 10-2021-0041418

(51) Int. Cl.
*H01M 50/105*    (2021.01)
*H01M 10/04*    (2006.01)
*H01M 10/0525*    (2010.01)

(52) U.S. Cl.
CPC ......... *H01M 50/105* (2021.01); *H01M 10/04* (2013.01); *H01M 10/0525* (2013.01)

(58) Field of Classification Search
CPC . H01M 50/105; H01M 10/04; H01M 10/0525
See application file for complete search history.

(56) References Cited

U.S. PATENT DOCUMENTS

| 2011/0003197 A1* | 1/2011 | Kritzer | ................ H01M 10/647 429/185 |
| 2012/0028109 A1* | 2/2012 | Itoh | ..................... H01M 50/105 429/163 |

(Continued)

FOREIGN PATENT DOCUMENTS

| CN | 107546343 A | 1/2018 |
| CN | 108701783 A | 10/2018 |

(Continued)

OTHER PUBLICATIONS

Machine Translation of KR-20200077304-A (Dec. 1, 2023) (Year: 2023).*

(Continued)

*Primary Examiner* — Matthew J Merkling
(74) *Attorney, Agent, or Firm* — Lerner David LLP

(57) ABSTRACT

A pouch-type battery case includes a cup portion, which accommodates therein an electrode assembly formed by stacking an electrode and a separator, and a plurality of die edges connecting an outer wall of the cup portion to a side extending from the outer wall. The die edges include a first region, which is rounded at a first radius (r1) of curvature and at which an electrode tab extending from the electrode is positioned, and a second region which is other than the first region and rounded at one or more second radii (r2, r3, r4) of curvature less than or equal to the first radius (r1) of curvature. The second region is divided into an inner region and an outer region with respect to the first region, and the radius (r2) of curvature in the inner region differs from the radii (r3, r4) of curvature in the outer region.

19 Claims, 14 Drawing Sheets

(56) References Cited

U.S. PATENT DOCUMENTS

| | | | |
|---|---|---|---|
| 2014/0370371 A1 | 12/2014 | Ozawa et al. | |
| 2015/0111088 A1* | 4/2015 | Hiroki | H01M 50/46 429/233 |
| 2016/0118640 A1* | 4/2016 | Miyake | H01M 50/553 429/163 |
| 2017/0025647 A1* | 1/2017 | Taniguchi | H01M 50/119 |
| 2017/0373286 A1 | 12/2017 | Kim et al. | |
| 2019/0051868 A1 | 2/2019 | Lee et al. | |
| 2020/0280044 A1 | 9/2020 | Park et al. | |
| 2021/0283671 A1* | 9/2021 | Kotik | B21D 51/16 |
| 2021/0384593 A1* | 12/2021 | Kim | H01M 50/553 |
| 2022/0069344 A1 | 3/2022 | Sasaki | |
| 2022/0109218 A1 | 4/2022 | Park et al. | |
| 2022/0320634 A1 | 10/2022 | Oh et al. | |
| 2022/0344789 A1 | 10/2022 | Kim et al. | |

FOREIGN PATENT DOCUMENTS

| | | |
|---|---|---|
| CN | 111357130 A | 6/2020 |
| JP | 2002208384 A | 7/2002 |
| JP | 2010232067 A | 10/2010 |
| JP | 2013154389 A | 8/2013 |
| JP | 2018085190 A | 5/2018 |
| JP | 2020179419 A | 11/2020 |
| JP | 2020188020 A | 11/2020 |
| KR | 20170091938 A | 8/2017 |
| KR | 20170124882 A | 11/2017 |
| KR | 20180001230 A | 1/2018 |
| KR | 20180082890 A | 7/2018 |
| KR | 20190098581 A | 8/2019 |
| KR | 20190106473 A | 9/2019 |
| KR | 20190115746 A | 10/2019 |
| KR | 20200077304 A * | 6/2020 |
| KR | 20210032916 A | 3/2021 |
| KR | 102562686 B1 | 8/2023 |
| WO | 2013128594 A1 | 9/2013 |
| WO | 2018104051 A1 | 6/2018 |
| WO | 2021054722 A1 | 3/2021 |

OTHER PUBLICATIONS

Extended European Search Report including Written Opinion for Application No. 21213617.0 dated Jun. 7, 2022, pp. 1-7.

Search Report dated Aug. 27, 2023 from the Office Action for Chinese Application No. 202210083634.2 dated Aug. 29, 2023, pp. 1-3. [See pp. 1-2, categorizing the cited references].

Notice of Allowance for Korean Application No. 10-2021-0041418 dated Jul. 4, 2023. 3 pgs.

* cited by examiner

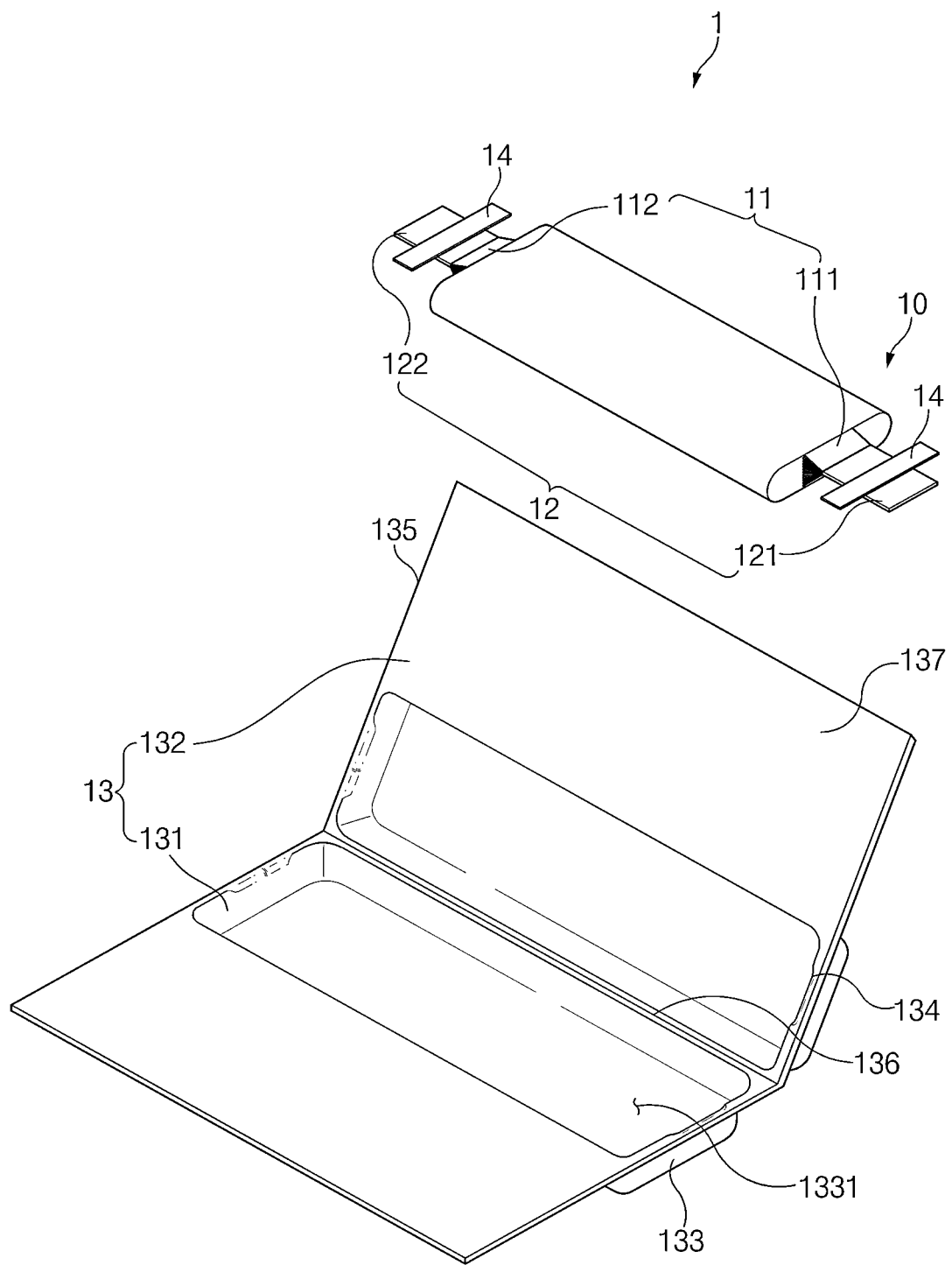
[FIG. 1]

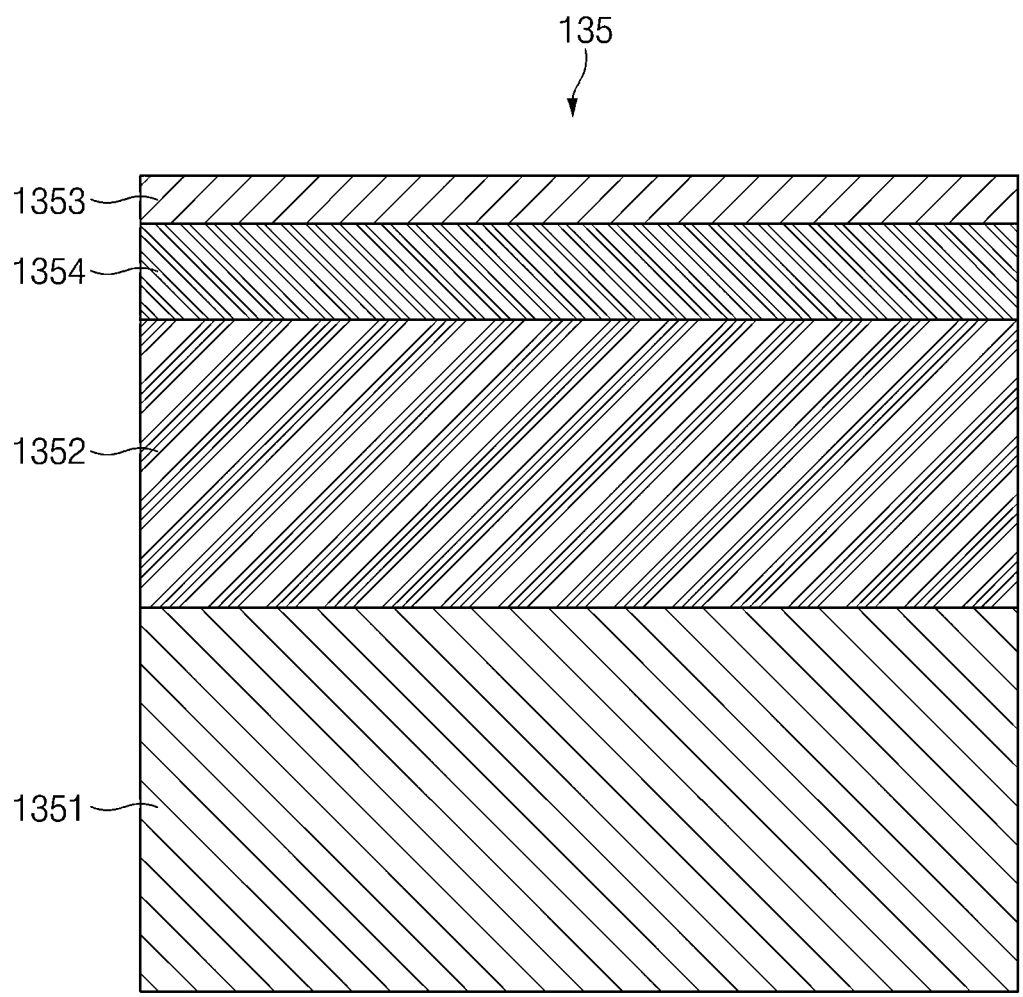
[FIG. 2]

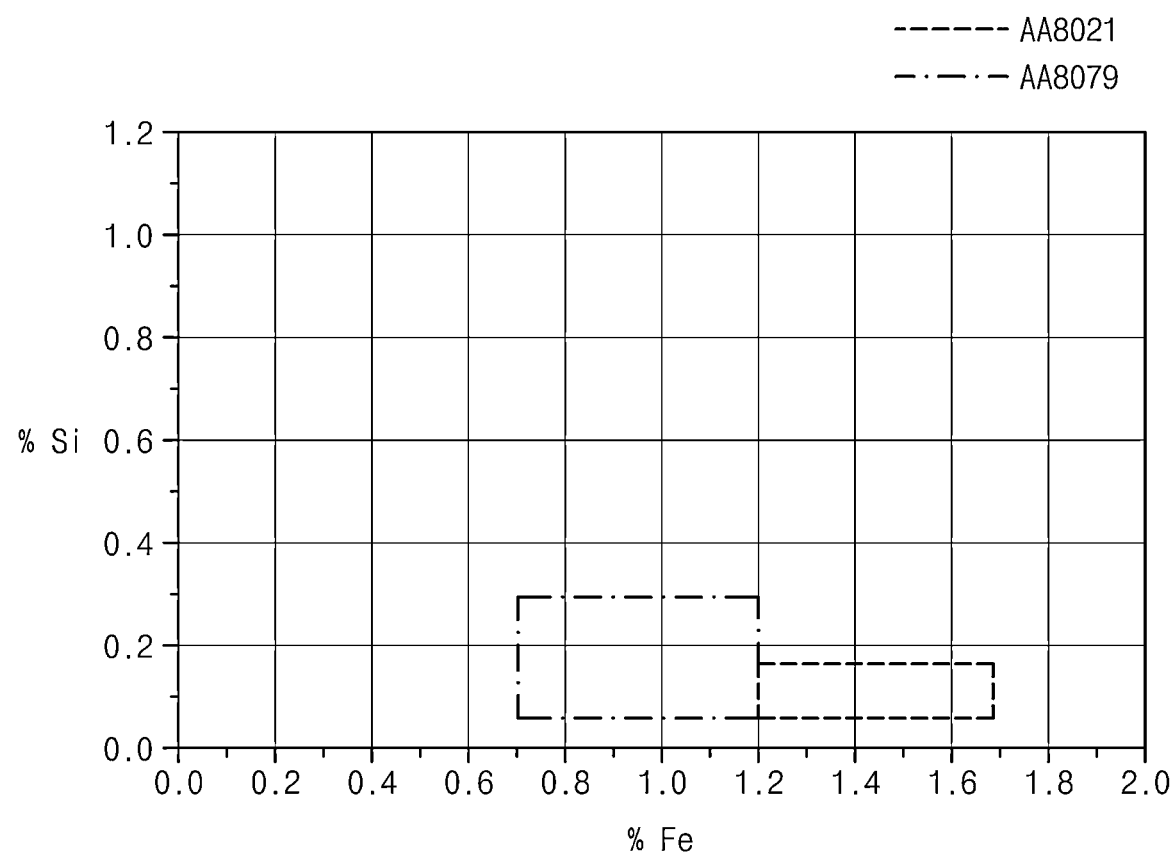

[FIG. 4]
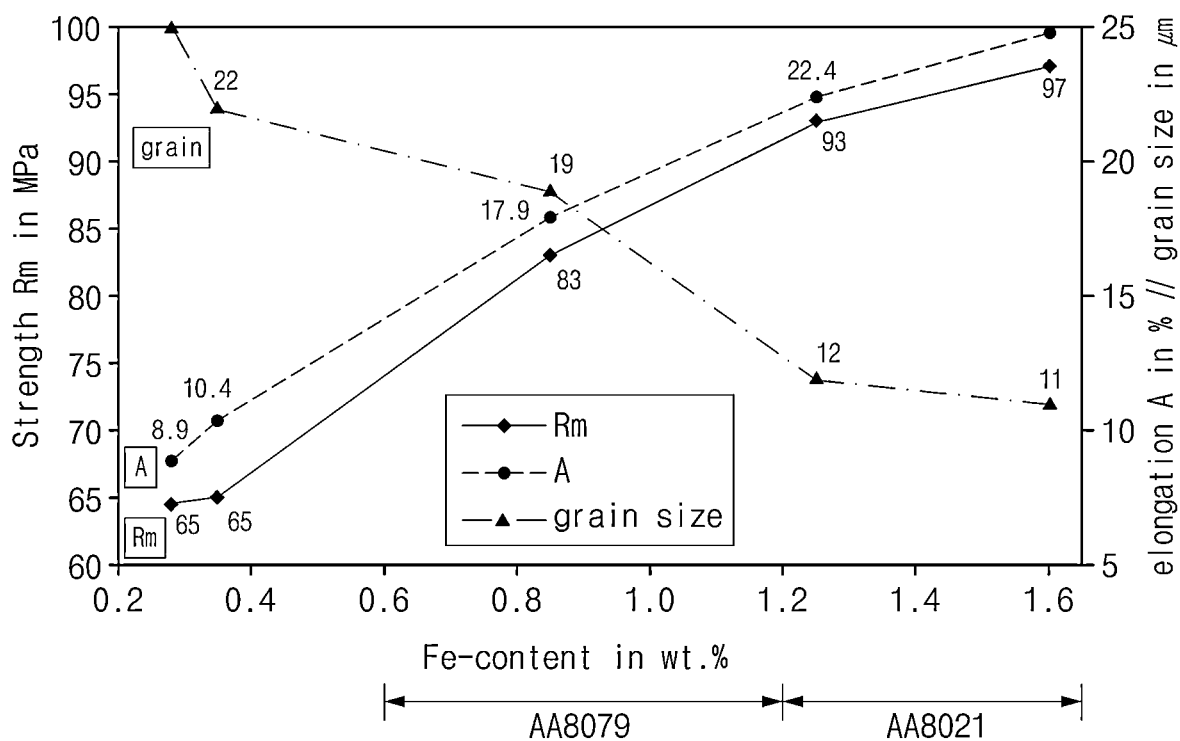

[FIG. 5]
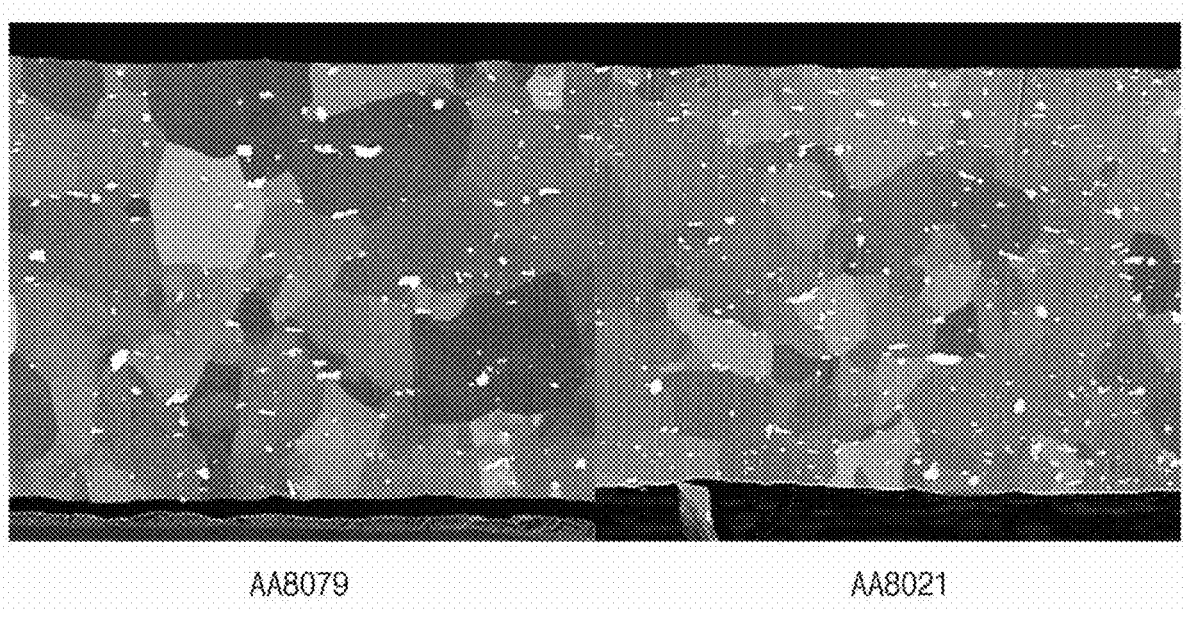

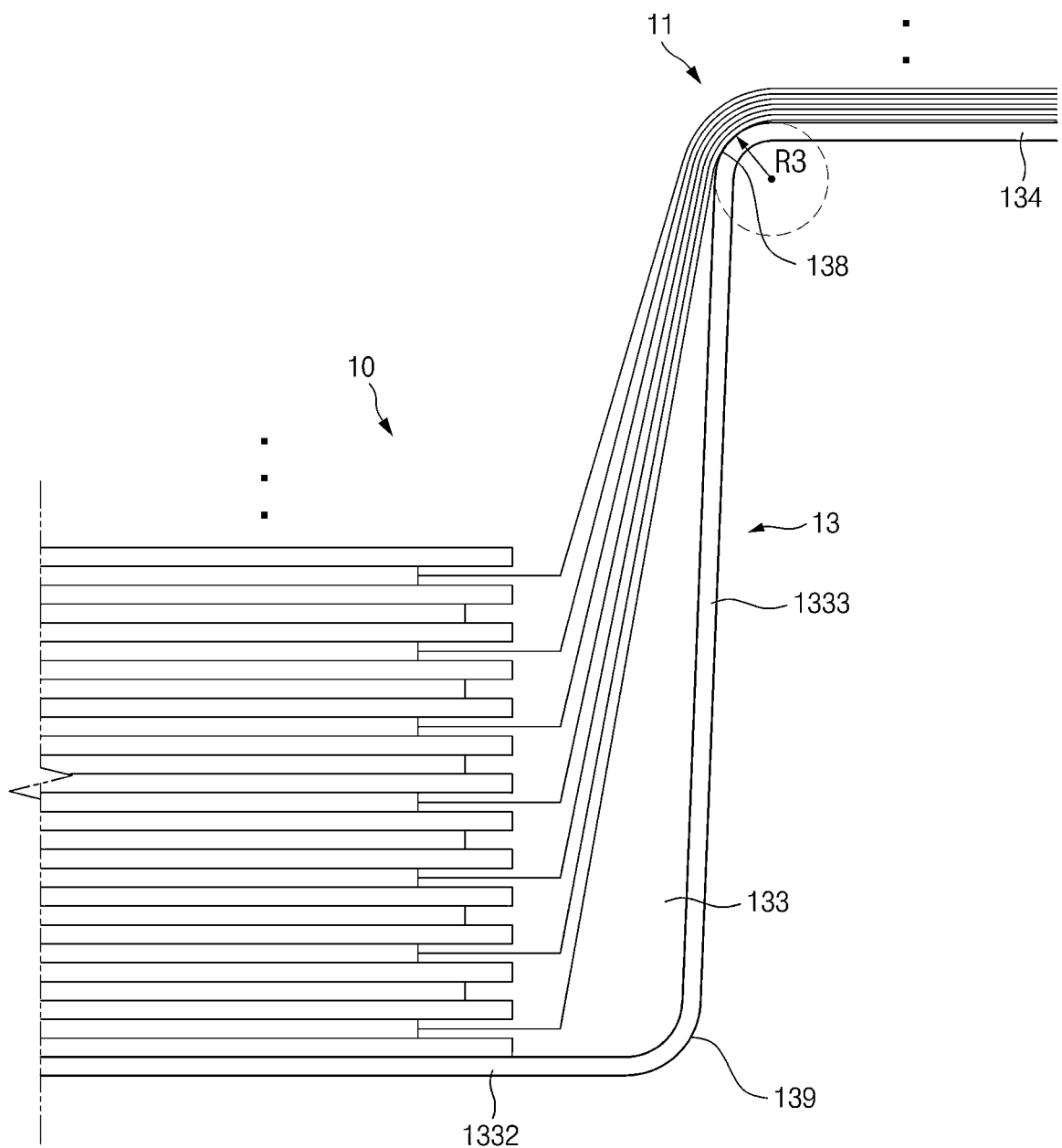
[FIG. 6]

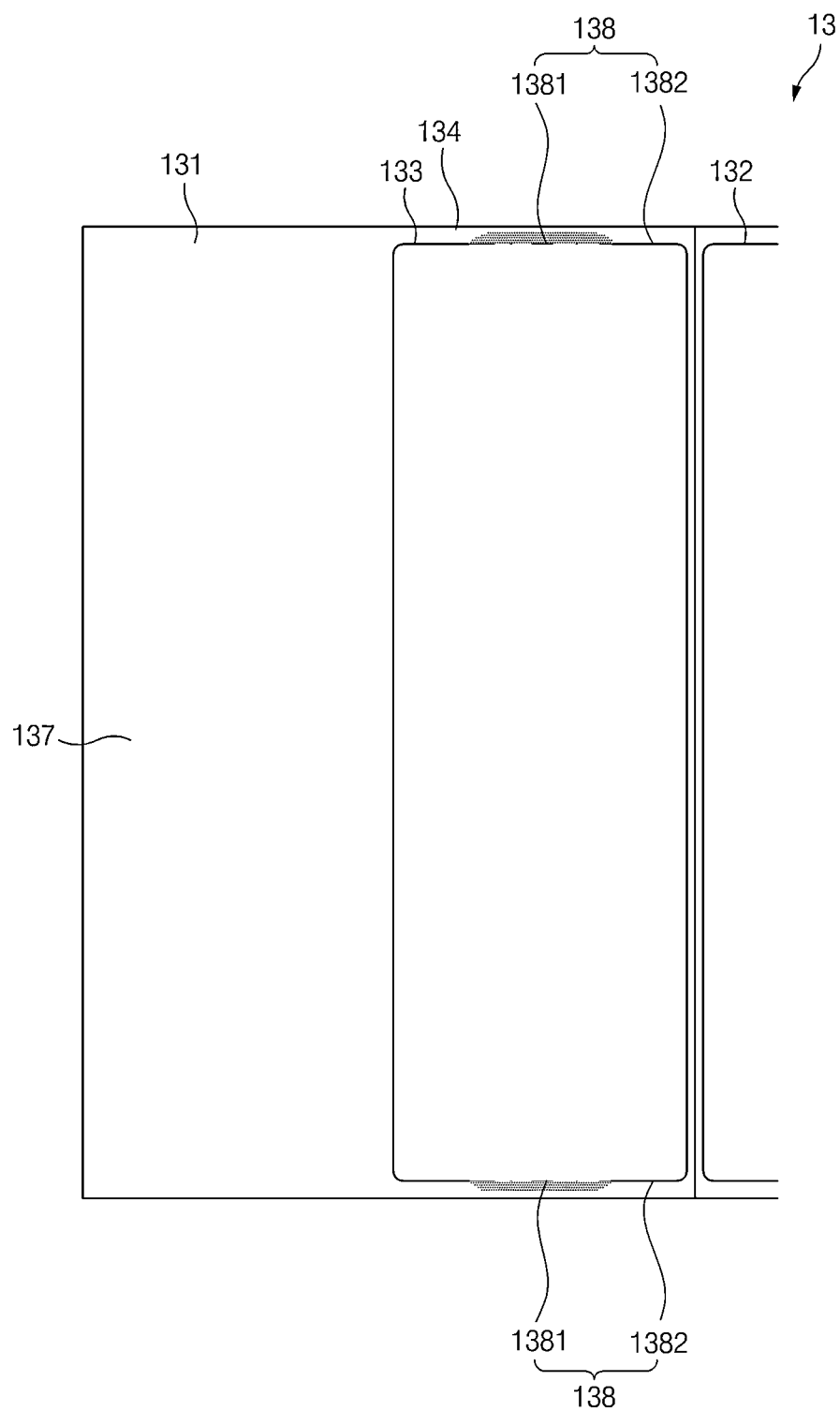
[FIG. 7]

[FIG. 8]
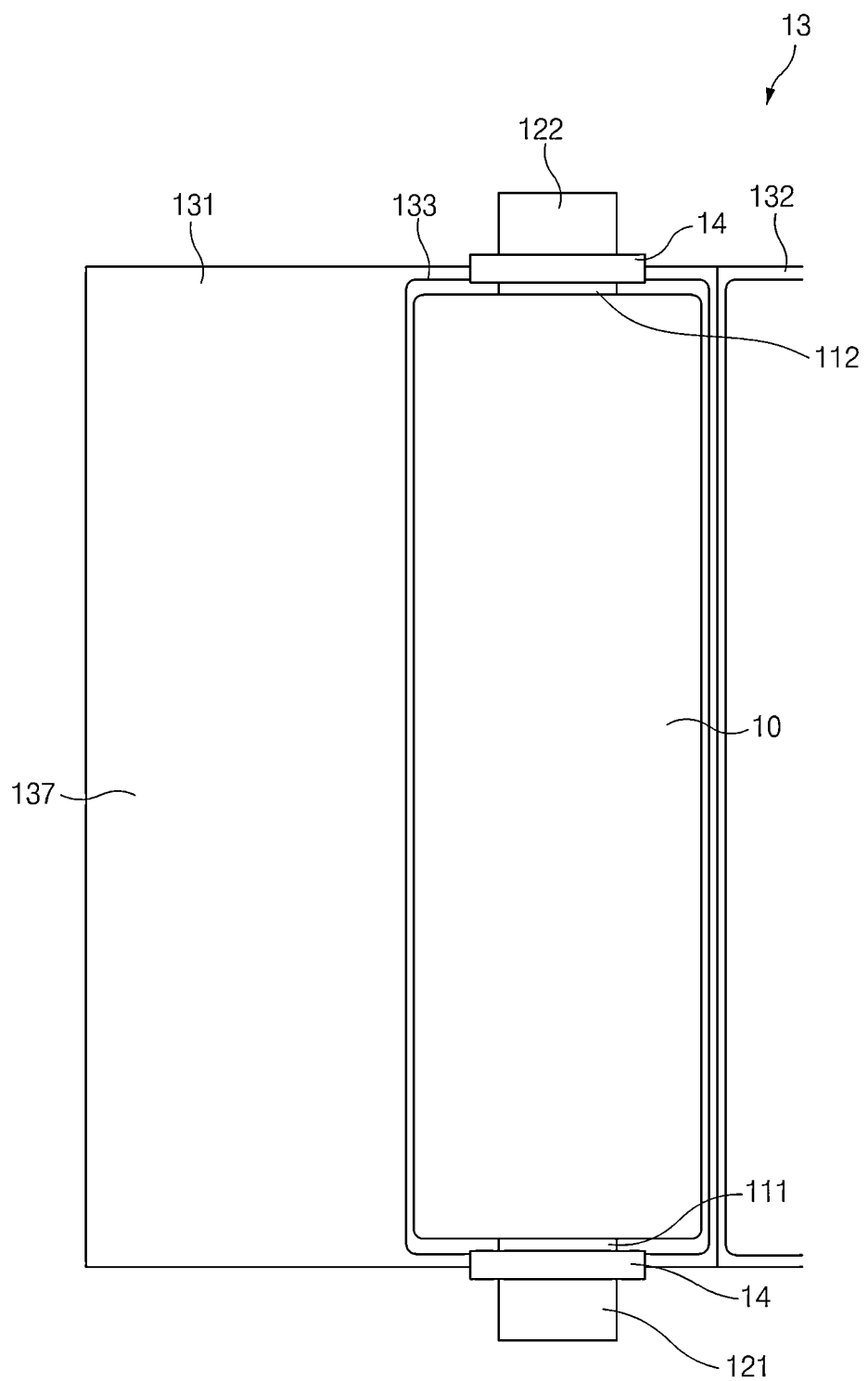

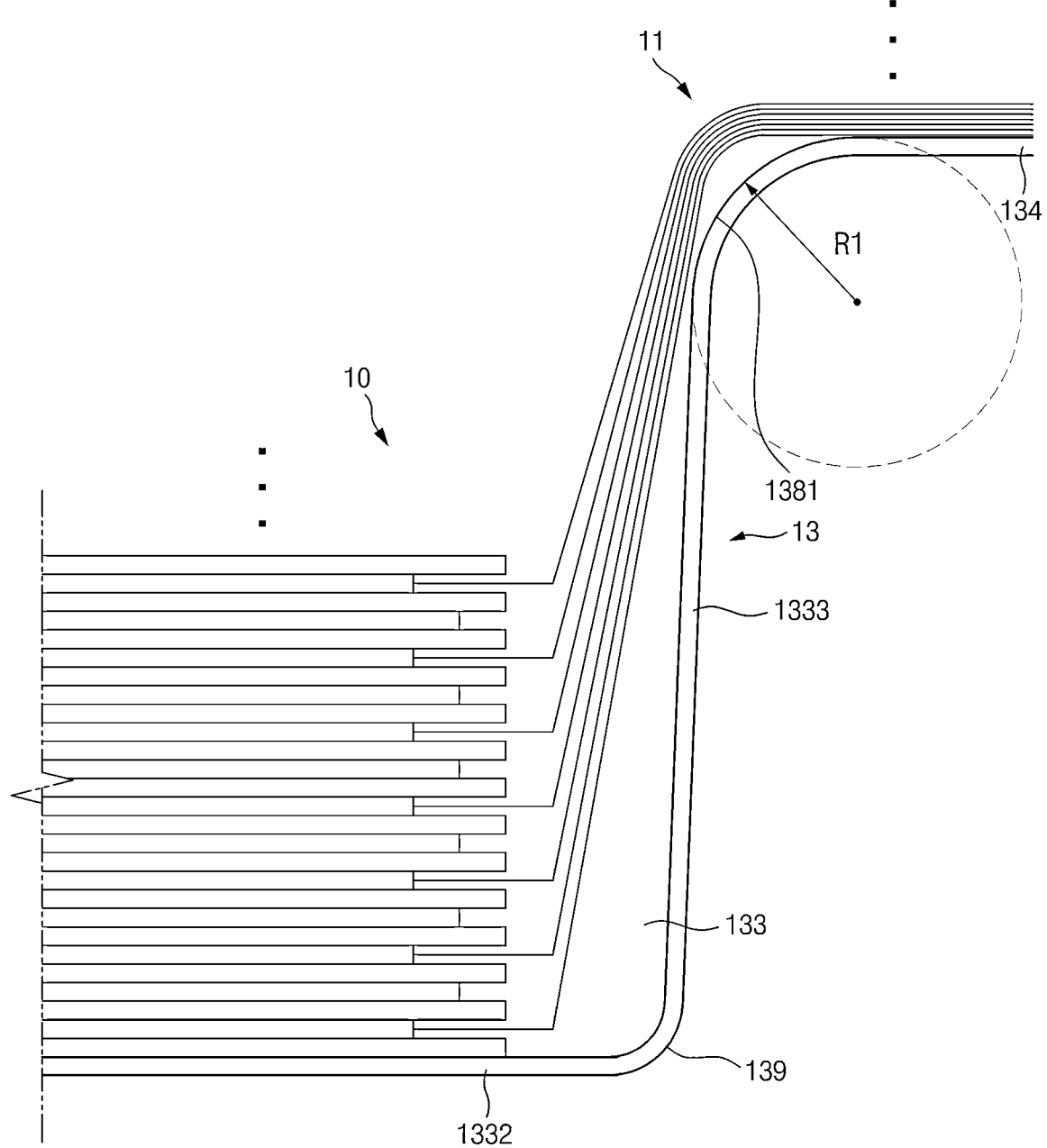
[FIG. 9]

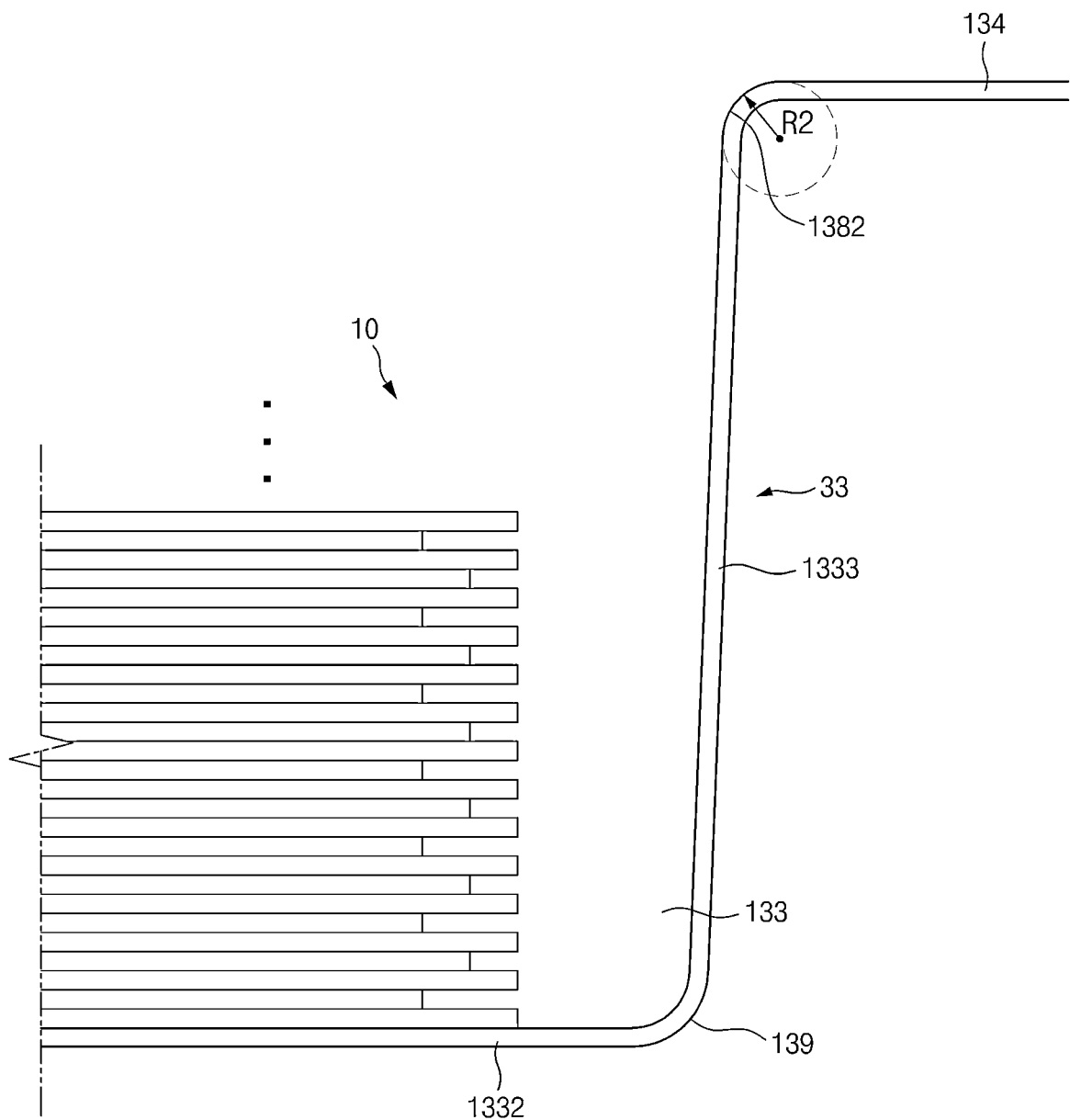
[FIG. 10]

[FIG. 11]
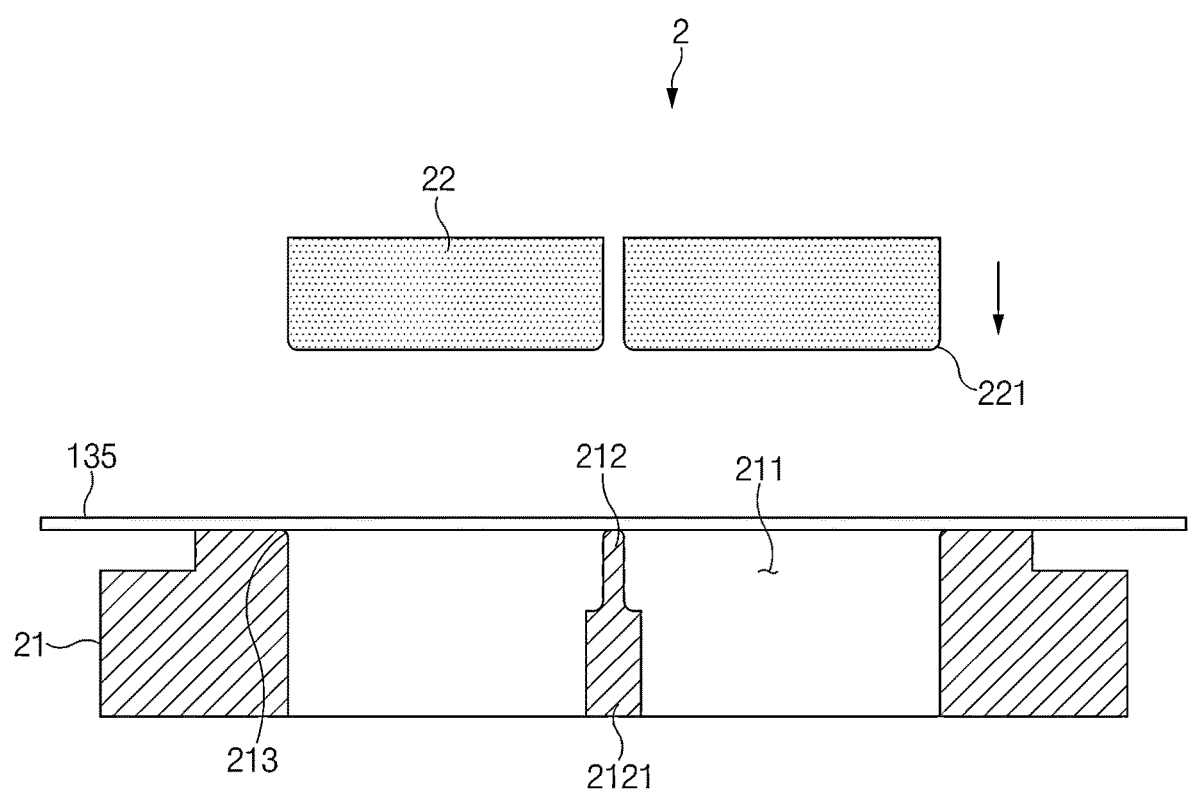

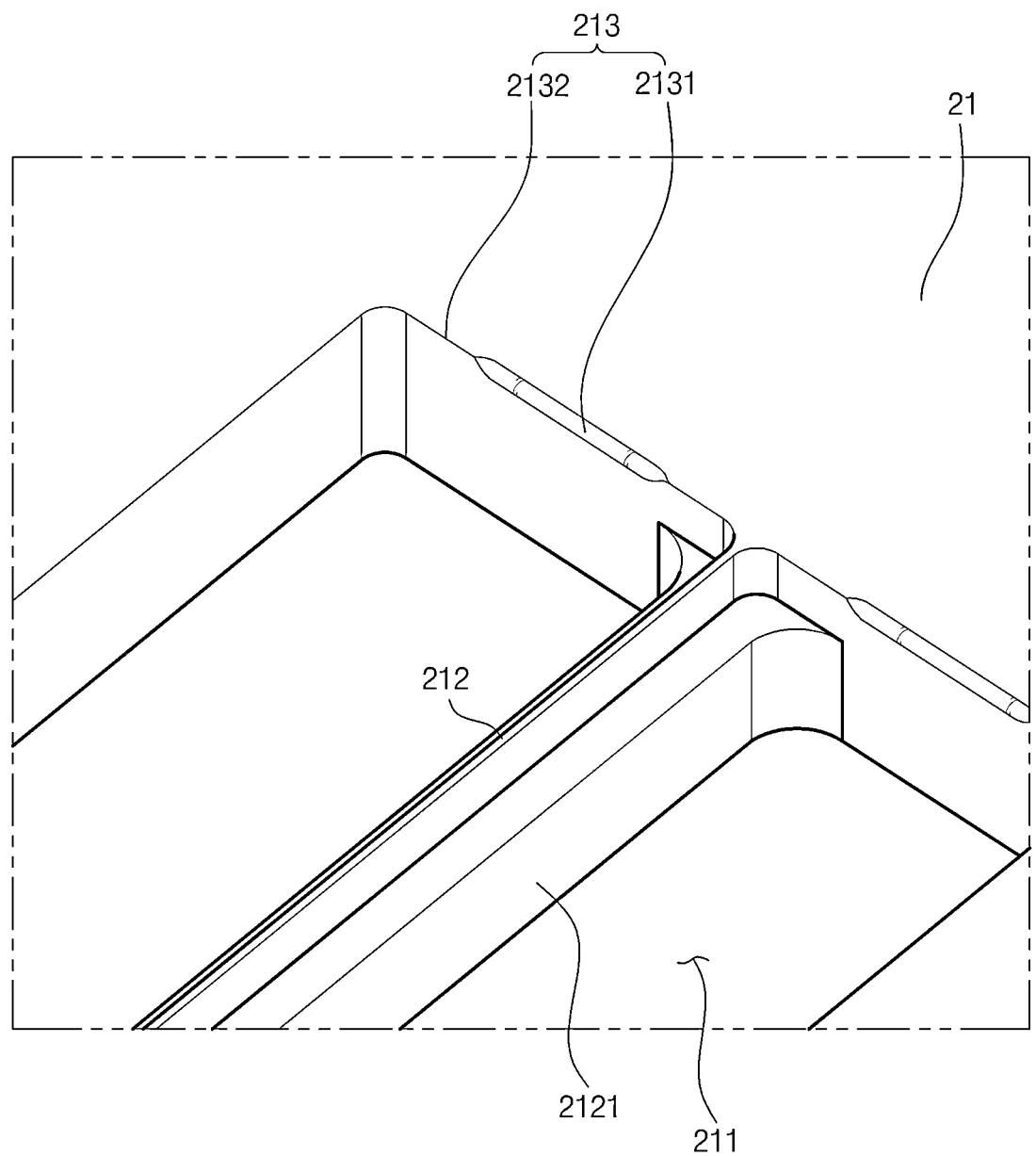
[FIG. 12]

[FIG. 13]
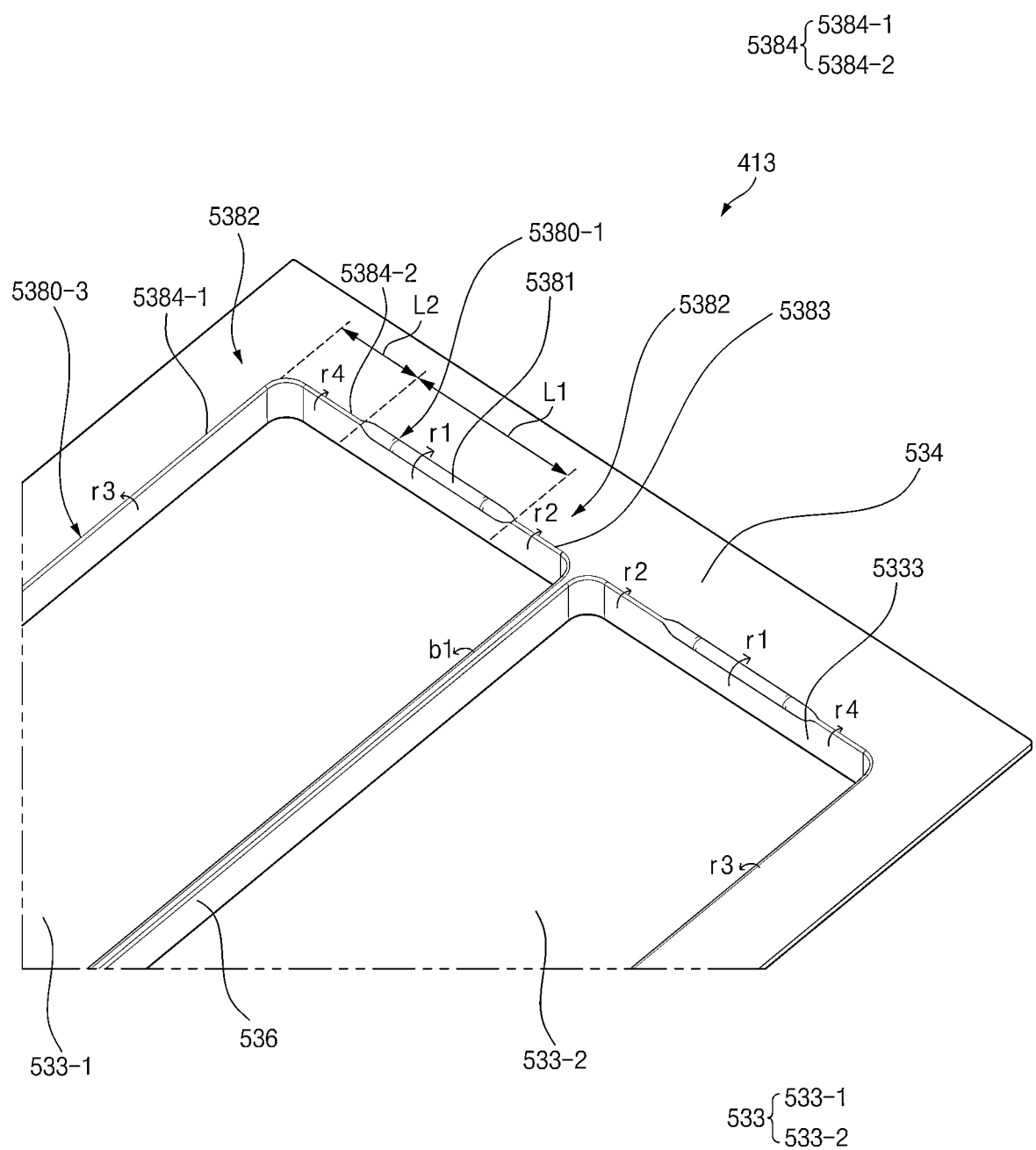

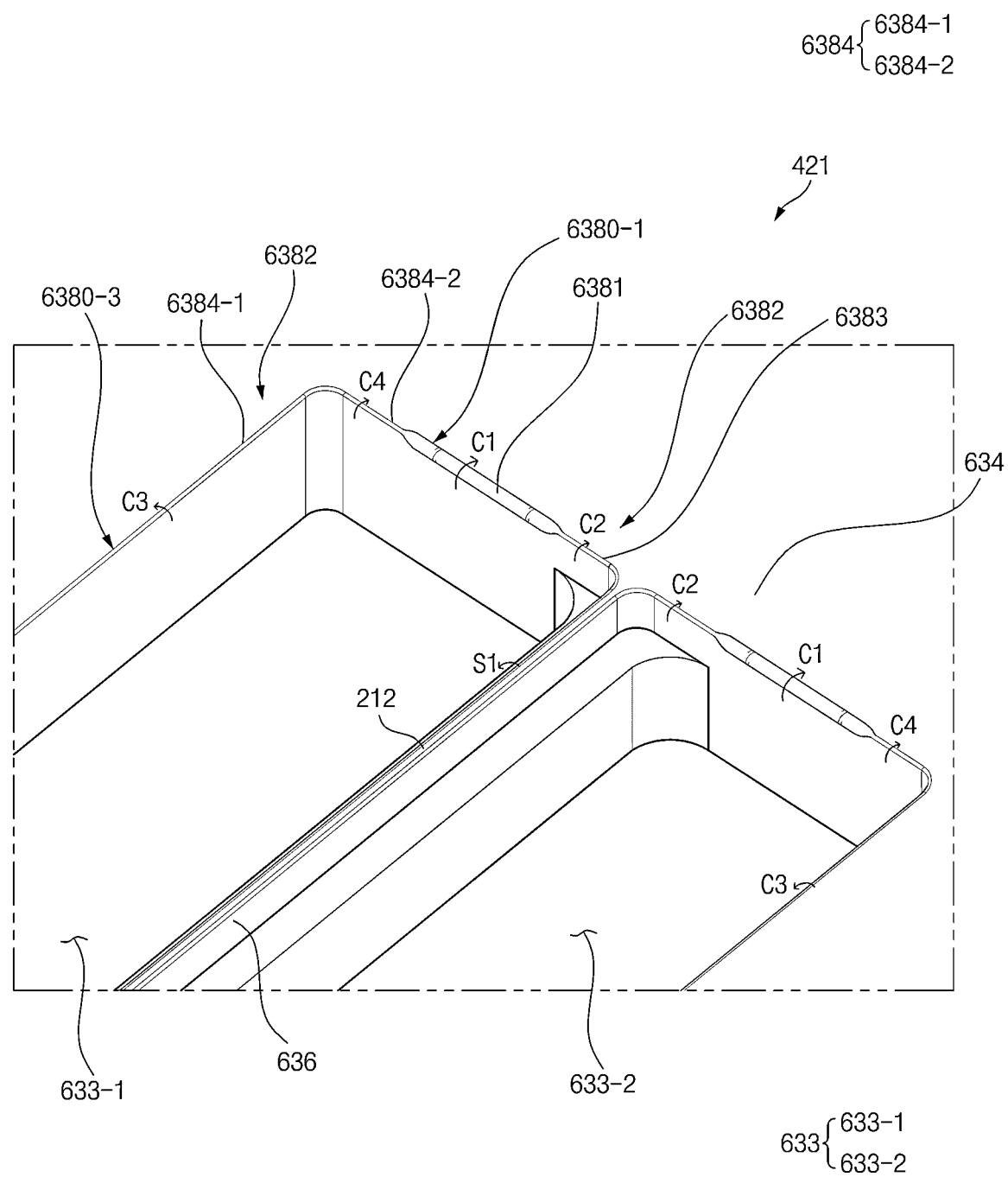
[FIG. 14]

POUCH-TYPE BATTERY CASE, APPARATUS FOR FORMING SAME, AND POUCH-TYPE SECONDARY BATTERY

CROSS-REFERENCE TO RELATED APPLICATIONS

This application claims the priority of Korean Patent Application No. 10-2021-0041418 filed on Mar. 30, 2021 in the Korean Intellectual Property Office, the disclosure of which is incorporated herein by reference.

BACKGROUND OF THE INVENTION

Field of the Invention

The present invention generally relates to a pouch-type battery case, an apparatus for forming same, and a pouch-type secondary battery. More specifically, the present invention relates to a pouch-type battery case with a die edge having a structure that does not interfere with an electrode tab, an apparatus for forming same, and a pouch-type secondary battery. Also, the present invention relates to: a pouch-type battery case that inhibits the occurrence of wrinkling in a corner portion of the pouch-type battery case, and eliminates a whitening phenomenon and reduces a risk of insulation breakdown in a side folding portion; an apparatus for forming same; and a pouch-type secondary battery.

Description of the Related Art

In general, there are several types of secondary batteries such as nickel cadmium batteries, nickel hydrogen batteries, lithium ion batteries, and lithium ion polymer batteries. These secondary batteries have been applied to and used for not only small products such as digital cameras, P-DVDs, MP3Ps, cellular phones, PDAs, portable game devices, power tools, and E-bikes, but also large products requiring high power such as electric vehicles and hybrid vehicles, and power storage devices or backup-power storage devices for storing surplus generated power and new renewable energy.

In order to manufacture the secondary batteries, electrode active material slurry is first applied to a positive electrode collector and a negative electrode collector to manufacture a positive electrode and a negative electrode, and the positive electrode and the negative electrode are then stacked on both sides of a separator to form an electrode assembly having a predetermined shape. Subsequently, the electrode assembly is accommodated in a battery case, and the battery case is sealed after an electrolyte is injected therein.

Secondary batteries are classified into a pouch type, a can type, or the like according to a material of a case that accommodates the electrode assembly. In the pouch type, the electrode assembly is accommodated in a pouch made of a flexible polymer material. Also, in the can type, the electrode assembly is accommodated in a case made of a metal, a plastic material, or the like.

The pouch, which is a case of the pouch-type secondary battery, is manufactured by forming a cup portion through press processing on a flexible pouch film. Then, after the cup portion has been formed, the electrode assembly is accommodated in an accommodation space of the cup portion, and sides thereof are sealed. Through this, the secondary battery is manufactured.

The drawing process, which may be a press process, is performed in a manner in which: a pouch film is inserted into a forming apparatus such as a press machine; and the pouch film is pressed and drawn by a punch. The pouch film is made of a plurality of layers, including a moisture barrier layer, which is formed of metal and positioned as an inner layer. When the formability of the moisture barrier layer is enhanced, an outer wall of the cup portion becomes almost vertical, and radii of curvature of edges of the cup portion are improved. However, in this case, a die edge among the edges can press electrode tabs, causing interference between the die edge and the electrode tabs.

Also, the radius of curvature of the die edge is determined irrespective of the radius of curvature of a bridge portion, and thus, there may be an occurrence of wrinkling in a corner portion of the pouch-type battery case. When this occurs, there is often a whitening phenomenon and a risk of insulation breakdown in a side folding portion.

PRIOR ART DOCUMENT

Patent Document (Patent Document 1) Korean Patent Publication No. 2017-0124882

SUMMARY OF THE INVENTION

An aspect of the present invention provides: a pouch-type battery case capable of preventing interference between a die edge and an electrode tab; an apparatus for forming same; and a pouch-type secondary battery.

Another aspect of the present invention provides: a pouch-type battery case capable of preventing wrinkling in a corner portion of the pouch-type battery case, eliminating a whitening phenomenon and reducing the risk of insulation breakdown in a side folding portion; an apparatus for forming same; and a pouch-type secondary battery.

The objects of the present invention are not limited to the aforementioned objects, but other objects not described herein will be clearly understood by those skilled in the art from descriptions below.

According to an aspect of the present invention, there is provided a pouch-type battery case including: a pouch film defining a first cup configured to accommodate an electrode assembly, a side portion at least partially surrounding the first cup, and at last one die edge arranged at a junction of the side portion and a wall of the first cup portion, wherein the at least one die edge include: a first rounded region defining a first radius of curvature, the first rounded region arranged to receive an electrode tab extending from the electrode assembly; and a second rounded defining one or more second radii of curvature, the one or more radii of curvature being less than or equal to the first radius of curvature, wherein the second rounded region includes an inner region and an outer region with respect to the first region, and a radius of curvature of the inner region is different from a radii of curvature of the outer region.

The pouch film may further include a second cup and a bridge formed between the first cup and the second cup to collectively accommodate the electrode assembly, and the at least one die edge includes a first die edge and a second die edge provided opposite the first cup from the first die edge, such that the first and second die edges extend in a direction transverse to a direction in which the bridge extends, and whereby the first rounded region is formed in each of the first and second die edges.

The inner region may be closer to the bridge than is the outer region.

The radii of curvature of the outer region may be greater than the radius of curvature of the inner region.

The bridge may define a radius of curvature that is equal to the radius of curvature of the inner region.

The radius of curvature of the bridge may be between about 0.3 mm and about 0.7 mm.

The radius of curvature of the bridge may be between about 0.45 mm and about 0.55 mm.

The outer region may include a main outer region on a third die edge extending between the first edge and the second die edge, and a connection outer region between the main outer region and the first rounded region, and whereby a radius of curvature of the main outer region may be equal to a radius of curvature of the connection outer region.

The radius of curvature of the main outer region and may be equal to or greater than about 1 mm, and the radius of curvature of the first region may be between about 1.5 mm and about 2.5 mm.

According to another aspect of the present invention, there is provided a battery case forming apparatus for manufacturing the pouch-type battery, the battery case forming apparatus includes: a die having a top surface, on which the pouch film is configured to be placed, and the die defines at least one forming space recessed inwardly relative to the top surface; and a disposed above the forming space and arranged to descend to the die to punch the pouch film into the forming space, wherein the die includes a plurality of pressing edges arranged at a junction of a wall defining the forming space and the top surface of the die, wherein the plurality of pressing edges include: a third rounded region having a third radius of curvature, the third rounded region arranged to form the first rounded region; and a fourth rounded region having one or more fourth radii of curvature less than or equal to the third radius of curvature, wherein the fourth rounded region includes a die inner region and a die outer region with respect to the third rounded region, and a radius of curvature of the die inner region is different from a radii of curvature of the die outer region.

The at least one forming space may include a first forming space and a second forming space, a die bridge may be formed between the first forming space and the second forming space, and the plurality of pressing edges includes a first pressing edge and a second pressing edge arranged opposite the at least one forming space from the first pressing edge, whereby the first and second pressing edges define the third region.

The die inner region may be closer to the die bridge than is the die outer region.

The radii of curvature of the die outer region may be greater than the radius of curvature of the die inner region.

The die bridge may define a radius of curvature that is equal to the radius of curvature of the die inner region.

The radius of curvature of the die bridge may be between about 0.3 mm and about 0.7 mm.

The radius of curvature of the die bridge may be between about 0.45 mm and about 0.55 mm.

The die outer region may include a main die outer region on a third pressing edge extending between the first pressing edge and the second pressing edge, and a connection die outer region between the main die outer region and the third region, whereby the radius of curvature of the main die outer region may be equal to the radius of curvature of the connection die outer region.

The radius of curvature of the main die outer region may be equal to or greater than approximately 1 mm, and the radius of curvature of the third region may be between about 1.5 mm and about 2.5 mm.

According to another aspect of the present invention, there is provided a pouch-type secondary battery including: an electrode assembly formed by stacking electrodes and separators; and a battery case including a cup accommodating the electrode assembly, a side portion surrounding the cup, and a plurality of die edges arranged at a junction of the side portion and a wall of the cup, wherein the plurality of die edges include: a first rounded region defining a first radius of curvature for receiving the electrode tabs extending from the electrode is positioned; and a second rounded region defining one or more second radii of curvature less than or equal to the first radius of curvature, wherein the second rounded region includes an inner region and an outer region with respect to the first rounded region, and a radius of curvature of the inner region is different than the radii of curvature of the outer region.

The outer region further comprises a main outer region on another one of plurality of die edges, and a connection outer region provided on the one of the plurality of die edges between the main outer region and the first rounded region, and wherein a radius of curvature of the main outer region is equal to a radius of curvature of the connection outer region. Other specific features of the present invention are included in the detailed description and drawings.

BRIEF DESCRIPTION OF THE DRAWINGS

The above and other aspects, features and advantages of the present invention will be more clearly understood from the following detailed description taken in conjunction with the accompanying drawings, in which:

FIG. 1 is an exploded view of a secondary battery according to an embodiment of the present invention;

FIG. 2 is a cross-sectional view of a pouch film according to an embodiment of the present invention;

FIG. 3 is a graph showing the iron and silicon contents in each of an alloy no. AA8079 aluminum alloy and an alloy no. AA8021 aluminum alloy;

FIG. 4 is a graph showing changes in a tensile strength Rm, an elongation rate, and a grain size according to the iron content in each of the alloy no. AA8079 aluminum alloy and the alloy no. AA8021 aluminum alloy;

FIG. 5 is an enlarged SEM image of grains of each of the alloy no. AA8079 aluminum alloy and the alloy no. AA8021 aluminum alloy;

FIG. 6 is an enlarged schematic view of a die edge and an electrode tab according to a comparative example of the present invention;

FIG. 7 is a partial plan view of a battery case according to an embodiment of the present invention;

FIG. 8 is a partial plan view showing an electrode assembly inserted into a cup portion of a battery case according to an embodiment of the present invention;

FIG. 9 is an enlarged schematic view of a first region of a die edge and an electrode tab according to an embodiment of the present invention;

FIG. 10 is an enlarged schematic view of a second region of a die edge of a cup portion and an electrode tab according to an embodiment of the present invention;

FIG. 11 is a schematic view of a forming apparatus according to an embodiment of the present invention;

FIG. 12 is an enlarged view of a portion of a die according to an embodiment of the present invention;

FIG. 13 is a perspective view of a battery case according to another embodiment of the present invention; and FIG. 14 is a perspective view of a forming apparatus for manufacturing a battery case according to another embodiment of the present invention.

DETAILED DESCRIPTION OF THE PREFERRED EMBODIMENT

Advantages and features of the present invention, and implementation methods thereof will be clarified through the following embodiments described in detail with reference to the accompanying drawings. The present invention may, however, be embodied in various different forms and should not be construed as limited to the embodiments set forth herein. Rather, these embodiments are provided so that this disclosure will be thorough and complete, and will fully convey the scope of the present invention to those skilled in the art. Further, the present invention is defined only by scopes of claims. Like reference numerals refer to like elements throughout.

Unless otherwise defined, all terms (including technical and scientific terms) used herein have the same meaning as commonly understood by one of ordinary skill in the art to which the present invention belongs. Also, terms as defined in a generally used dictionary are not construed ideally or excessively unless defined apparently and specifically.

The terms used in this specification are used only to explain embodiments while not limiting the present invention. In this specification, the singular forms include the plural forms as well, unless the context clearly indicates otherwise. The meaning of "comprises" and/or "comprising" used in the specification does not exclude the presence or addition of one or more components other than the mentioned component. Also as used herein, the terms "substantially," "generally," "approximately," and "about" are intended to mean that slight deviation from absolute are included within the scope of the term so modified.

Hereinafter, preferred embodiments of the present invention will be described in detail with reference to the accompanying drawings.

FIG. 1 is an exploded view of a secondary battery 1 according to an embodiment of the present invention.

According to an embodiment of the present invention, as the tensile strength and elongation rate of a pouch film 135 are improved to increase toughness, the formability of the pouch film 135 may be enhanced when a pouch-type battery case 13 is manufactured from the pouch film 135.

Referring to FIG. 2, the pouch film 135 includes: a sealant layer 1351 made of a first polymer and formed as an innermost layer; a surface protection layer 1353 made of a second polymer and formed as an outermost layer; and a moisture barrier layer 1352 which is made of a metal including an alloy no. AA80XX series aluminum alloy and stacked between the surface protection layer 1353 and the sealant layer 1351. The thickness of the moisture barrier layer 1352 is about 50 μm to about 80 μm, and the thickness of the sealant layer 1351 is about 60 μm to about 100 μm. Particularly, it is preferable that the thickness of the moisture barrier layer 1352 is about 55 μm to about 65 μm and the thickness of the sealant layer 1351 is about 75 μm to about 85 μm.

Referring back to FIG. 1, an electrode assembly 10 is formed by alternately stacking electrodes and separators. A slurry, in which an electrode active material, a binder, and a plasticizer are mixed, is first applied to a positive electrode collector and a negative electrode collector to manufacture electrodes such as a positive electrode and a negative electrode. Then, the separators are stacked between the electrodes to form the electrode assembly 10, and the electrode assembly 10 is inserted into the battery case 13. Subsequently, the battery case 13 is sealed after an electrolyte is injected therein.

Particularly, the electrode assembly 10 includes two types of electrodes, such as a positive electrode and a negative electrode, and a separator interposed between the electrodes to insulate the electrodes from each other. The electrode assembly 10 may be a stacking type, a jelly roll type, a stacking and folding type, or the like. Each of these two types of electrodes, that is, the positive electrode and the negative electrode has a structure in which active material slurry is applied to an electrode collector having a metal foil or a metal mesh including aluminum and copper. Generally, the slurry may be formed by mixing granular active materials, auxiliary conductors, binders, plasticizers, and the like in a state in which a solvent is added. The solvent is removed during a subsequent process.

The electrode assembly 10 includes an electrode tab 11 as illustrated in FIG. 1. The electrode tab 11 is connected to each of the positive electrode and the negative electrode of the electrode assembly 10, and protrudes outward from the electrode assembly 10, thereby providing a path through which electrons may move between the inside and the outside of the electrode assembly 10. Each of the electrode collectors of the electrode assembly 10 has a portion which is coated with the electrode active material and an end portion that is not coated with the electrode active material. The electrode tab 11 may be formed by cutting the uncoated portion or formed by connecting a separate conductive member to the uncoated portion through ultrasonic welding or the like. Although the electrode tabs 11 may protrude in different directions of the electrode assembly 10 as illustrated in FIG. 1, the embodiment is not limited thereto. The electrode tabs 11 may protrude in other directions, for example, from one side of the electrode assembly 10 such that the electrode tabs extend side by side in the same direction.

An electrode lead 12, which supplies electricity to the outside of the secondary battery 1, is connected to the electrode tabs 11 of the electrode assembly 10 through spot welding or the like. A portion of the electrode lead 12 is surrounded by an insulating part 14. The position of the insulating part 14 is provided at side portion 134, at which a first case 131 and a second case 132 of the battery case 13 are thermally fused, so that the electrode lead 12 is bonded to the battery case 13. Accordingly, the electricity generated from the electrode assembly 10 is prevented from flowing to the battery case 13 through the electrode lead 12, and the sealing of the battery case 13 is maintained. Thus, the insulating part 14 is made of a non-conductive material in which electricity does not flow well. The insulating part 14 may be a relatively thin insulating tape attached to the electrode lead 12, however, the embodiment is not limited thereto. Various other non-conductive material may be used as the insulating part 14 as long as the material is capable of insulating the electrode lead 12.

One end of the electrode lead 12 is connected to the electrode tab 11, and the other end thereof protrudes outward from the battery case 13. That is, the electrode lead 12 includes: a positive electrode lead 121 which has one end connected to a positive electrode tab 111 and extends in a direction in which the positive electrode tab 111 protrudes; and a negative electrode lead 122 which has one end connected to a negative electrode tab 112 and extends in a direction in which the negative electrode tab 112 protrudes. The other ends of the positive electrode lead 121 and the negative electrode lead 122 protrude outward from the battery case 13 as illustrated in FIG. 1. Accordingly, the electricity generated inside the electrode assembly 10 may be supplied to the outside. Also, since the positive electrode tabs 111 and the negative electrode tabs 112 protrude in opposite directions, the positive electrode lead 121 and the negative electrode lead 122 may also extend in opposite directions.

The positive electrode lead 121 and the negative electrode lead 122 may be made of materials different from each other. That is, the positive electrode lead 121 may have the same aluminum (Al) material as the positive electrode collector, and the negative electrode lead 122 may have the same copper (Cu) material or nickel (Ni)-coated copper material as the negative electrode collector. Also, a portion of the electrode lead 12 protruding outward from the battery case 13 serves as a terminal part and is electrically connected to an external terminal.

The battery case 13 is a pouch which is made of a flexible material and accommodates the electrode assembly 10 therein. Hereinafter, the battery case 13 will be described as being the pouch. When the flexible pouch film 135 is drawn, using a punch 22 (illustrated in FIG. 11) or the like, a portion of the flexible pouch film 135 forms a cup portion 133 that includes an accommodation space 1331 having a bag shape. Through this, the battery case 13 is manufactured.

The battery case 13 is sealed after accommodating the electrode assembly 10 so that a portion of the electrode lead 12 is exposed. The battery case 13 includes the first case 131 and the second case 132 as illustrated in FIG. 1. The first case 131 has the cup portion 133 to provide the accommodation space 1331 which may accommodate the electrode assembly 10, and the second case 132 covers the accommodation space 1331 from above so as to prevent the electrode assembly 10 from moving out from the battery case 13. The first case 131 and the second case 132 may be manufactured such that the respective sides thereof are connected to each other as illustrated in FIG. 1, but the embodiment is not limited thereto. These cases may be diversely manufactured, for example, individually manufactured and separated from each other.

When the cup portion 133 is formed in the pouch film 135, only one cup portion 133 may be formed in one pouch film 135. However, the embodiment is not limited thereto, and two neighboring cup portions 133 may be drawn and formed in one pouch film 135. Accordingly, as illustrated in FIG. 1, the cup portion 133 may be formed in each of the first case 131 and the second case 132. Here, the depths D of the cup portions 133 formed in the first case 131 and the second case 132 may be equal to each other. However, the embodiment is not limited thereto, and the depths may be different from each other. After the electrode assembly 10 is accommodated in the accommodation space 1331 provided in the cup portion 133 of the first case 131, the battery case 13 may be folded about a bridge 136 so that the two cup portions 133 face each other. The bridge 136 is formed between the two cup portions 133 in the battery case 13. Accordingly, the cup portion 133 of the second case 132 also accommodates the electrode assembly 10 from above. Thus, the two cup portions 133 accommodate one electrode assembly 10, and thus, a thicker electrode assembly 10 may be accommodated compared to the battery case 13 having one cup portion 133. Also, the first case 131 and the second case 132 are integrally connected to each other as the battery case 13 is folded, and thus, the number of sides portions 134 required to be sealed during a subsequent sealing process may be reduced. Thus, the process speed may be enhanced, and the number of sealing processes may also be reduced.

Meanwhile, the battery case 13 may include: the cup portion 133 which has the accommodation space 1331 for accommodating the electrode assembly 10; and a degassing portion 137 which is formed on a side portion of the cup portion 133 and allows a gas generated inside the cup portion 133 to be discharged through a degassing hole. After the electrode assembly 10 is accommodated in the cup portion 133 of the battery case 13, an activation process is performed after an electrolyte is injected into the battery case 13, thereby generating a gas inside the battery case 13. As a result, a degassing process must be performed to discharge the gas to the outside.

Again, the electrode lead 12 is connected to the electrode tab 11 of the electrode assembly 10, and the insulating part 14 is formed on a portion of the electrode lead 12. Then, the electrode assembly 10 is accommodated in the accommodation space 1331 provided in the cup portion 133 of the first case 131, and the second case 132 covers the space from above. Subsequently, the electrolyte is injected therein, and the side portions 134, which extend outward from the cup portions 133 of the first case 131 and the second case 132, are sealed. The electrolyte is injected into the battery case 13 to move lithium ions generated by an electrochemical reaction of the electrode during charging and discharging of the secondary battery 1. The electrolyte may include a non-aqueous organic electrolyte, which is a mixture of a lithium salt and a high-purity organic solvent, or may include a polymer using a polymer electrolyte. Furthermore, the electrolyte may also include a sulfide-based, oxide-based, or polymer-based solid electrolyte, and the solid electrolyte may be flexible enough to be easily deformed by an external force. Through the method described above, the pouch-type secondary battery 1 may be manufactured.

FIG. 2 is a cross-sectional view of the pouch film 135 according to the embodiment of the present invention.

The pouch, which is manufactured into the battery case 13 of the pouch-type secondary battery 1 according to the embodiment of the present invention, is formed by drawing the pouch film 135. That is, the pouch is manufactured as the cup portion 133 is formed by drawing the pouch film 135 with the punch 22 (FIG. 11) or the like. According to an embodiment of the present invention, as illustrated in FIG. 2, the pouch film 135 includes a sealant layer 1351, a moisture barrier layer 1352, a surface protection layer 1353, and a drawing assistance layer 1354.

The sealant layer 1351 is made of a first polymer, and formed as an innermost layer that comes into direct contact with the electrode assembly 10. Here, the innermost layer represents a layer which is positioned farthest away from the moisture barrier layer 1352 in the direction toward the electrode assembly 10. When the pouch film 135 having the stack structure described above is drawn using the punch 22 or the like, a portion of the pouch film 135 is drawn to form the cup part 133 that includes the accommodation space 1331 having a bag shape. Through this, the battery case 13 is manufactured. Also, when the electrode assembly 10 is accommodated in the inside of the accommodation space 1331, the electrolyte is injected. Subsequently, the first case 131 and the second case 132 are brought into contact with each other, and the side portion 134 is then heat-pressed. Accordingly, sealant layers 1351 are bonded to each other, and the pouch is sealed. Here, the sealant layer 1351 has to have insulating characteristics because the sealant layer 1351 is in direct contact with the electrode assembly 10, and also has to have corrosion resistance because the sealant layer 1351 comes into contact with the electrolyte. Also, the sealant layer 1351 has to have high sealing characteristics because the sealant layer 1351 has to completely seal the inside environment from the outside environment to prevent the movement of materials between the inside and the outside. The side portion 134 in which the sealant layers 1351 are bonded to each other has to have excellent thermal bonding strength. Generally, the first polymer used to manufacture the sealant layer 1351 may be made of one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, polyolefin-based resin such as polypropylene (PP) or polyethylene (PE) is mainly used. Since the polypropylene (PP) has excellent mechanical properties such as tensile strength, rigidity, surface hardness, wear resistance, and thermal resistance, and excellent chemical properties such as corrosion resistance, the polypropylene is mainly used to manufacture the sealant layer 1351. In addition, casted polypropylene, acid modified polypropylene, or polypropylene-butylene-ethylene terpolymer may be used. Here, the acid modified polypropylene may be maleic anhydride polypropylene (MAH PP). Also, the sealant layer 1351 may have a single layer structure, which is made of one material, or a composite layer structure, in which two or more materials constitute respective layers.

According to an embodiment of the present invention, the sealant layer 1351 may have a thickness of about 60 μm to about 100 μm, particularly, about 75 μm to about 85 μm. If the thickness of the sealant layer is less than about 60 μm, the sealing durability may be deteriorated, and the inside of the sealant layer may be broken when sealed. On the contrary, if the thickness of the sealant layer is greater than about 100 μm, the overall thickness of the pouch becomes excessively large. Thus, the energy density to the volume of the secondary battery may be deteriorated.

The moisture barrier layer 1352 is stacked between the surface protection layer 1353 and the sealant layer 1351 to ensure the mechanical strength of the pouch, blocks gas or moisture from entering the secondary battery 1, and prevents the electrolyte from leaking. The moisture barrier layer 1352 is made of metal, and particularly, the moisture barrier layer 1352 according to an embodiment of the present invention may be made of metal including an alloy no. AA80XX series aluminum alloy. The aluminum may be lightweight while ensuring at least a predetermined level of the mechanical strength, and also may supplement electrochemical properties by the electrode assembly 10 and the electrolyte and ensure heat radiation or the like.

In the related art, an alloy no. AA30XX series aluminum alloy has been frequently used. However, the iron content may be equal to or less than about 0.7 wt %, and thus, the mechanical strength is relatively low. To improve the mechanical strength, the aluminum alloy according to an embodiment of the present invention is the alloy no. AA80XX series aluminum alloy. This aluminum alloy may include various materials. For example, the materials may include one or two or more selected from the group consisting of iron (Fe), copper (Cu), chrome (Cr), manganese (Mn), nickel (Ni), magnesium (Mg), and zinc (Zn).

Also, according to an embodiment of the present invention, the moisture barrier layer 1352 may have the thickness of about 50 μm to about 80 μm, and more particularly, about 55 μm to about 65 μm. In the related art, the thickness of the moisture barrier layer is less than about 50 μm, and thus, the formability is lower than that of the present invention. Accordingly, when the pouch film of the related art is drawn, it is difficult to form a cup portion having an almost vertical outer wall when the cup portion is formed to have a large depth. Also, it is difficult to reduce a radius of curvature of an edge of the cup portion.

On the contrary, if the thickness of the moisture barrier layer is greater than about 80 μm, not only does the manufacturing costs increase, but the overall thickness of the secondary battery excessively increases. Thus, the energy density to the volume of the secondary battery is deteriorated. If the thickness of the sealant layer is reduced to less than about 60 μm so as to reduce the overall thickness of the secondary battery, the sealing durability is deteriorated.

The surface protection layer 1353 is made of a second polymer and formed as an outermost layer that electrically insulates the electrode assembly 10 and protects the secondary battery 1 from the outside environment. Here, the outermost layer represents a layer which is positioned farthest away from the moisture barrier layer 1352 in the direction opposite to the electrode assembly 10. The second polymer used to manufacture the surface protection layer 1353 may be one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, it is desirable to mainly use polymers having high wear resistance and thermal resistance such as polyethylene terephthalate (PET). Also, the surface protection layer 1353 may have a single layer structure, which is made of one material, or a composite layer structure, in which two or more materials constitute respective layers.

According to an embodiment of the present invention, the surface protection layer 1353 may have the thickness of about 5 μm to about 25 μm, and more particularly, about 7 μm to about 12 μm. If the thickness of the surface protection layer is less than about 5 μm, the external insulation may be deteriorated. On the contrary, if the thickness of the surface protection layer is greater than about 25 μm, the overall thickness of the pouch becomes large. Thus, the energy density to the volume of the secondary battery may be deteriorated instead.

Meanwhile, PET is not expensive and has excellent durability and electrical insulating properties. However, PET may have poor adhesion with the aluminum frequently used as the moisture barrier layer 1352 and have a different behavior from the aluminum when subjected to stress and drawn. Thus, when the surface protection layer 1353 is bonded directly to the moisture barrier layer 1352, the surface protection layer 1353 may be peeled off from the moisture barrier layer 1352 during the drawing, resulting in the moisture barrier layer 1352 not being uniformly drawn. Thus, the formability may be deteriorated.

According to an embodiment of the present invention, the battery case 13 may further include the drawing assistance layer 1354 which is made of a third polymer and stacked between the surface protection layer 1353 and the moisture barrier layer 1352. The drawing assistance layer 1354 may be stacked between the surface protection layer 1353 and the moisture barrier layer 1352 to prevent the surface protection layer 1353 and the moisture barrier layer 1352 from being in direct contact with one another and peeled off when drawn. The third polymer used to manufacture the drawing assistance layer 1354 may be one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. Particularly, the nylon resin is easily bonded to the polyethylene terephthalate (PET) of the surface protection layer 1353 and has a similar behavior, when drawn, to the aluminum alloy of the moisture barrier layer 1352. Thus, the nylon resin may be mainly used as the third polymer. Also, the drawing assistance layer 1354 may have a single layer structure, which is made of one material, or a composite layer structure, in which two or more materials constitute respective layers.

According to the related art, the moisture barrier layer has a thickness of about 40 µm, and accordingly, the drawing assistance layer has an extremely small thickness of about 15 µm. That is, the ratio of thicknesses between the drawing assistance layer and the moisture barrier layer is about 1:2.67, and a proportion of the moisture barrier layer to the thickness is significantly high. However, as described above, according to an embodiment of the present invention, the moisture barrier layer 1352 has the thickness of about 50 µm to about 80 µm, and more particularly, about 55 µm to about 65 µm, and thus, the formability of the moisture barrier layer 1352 is enhanced. Here, in order to enhance the formability of the drawing assistance layer 1354, the drawing assistance layer 1354 may have the thickness of about 20 µm to about 50 µm, and more preferably, about 25 µm to about 38 µm. If the thickness is less than about 20 µm, the drawing assistance layer does not conform to the enhanced formability of the moisture barrier layer and thus may be damaged while being drawn. On the contrary, if the thickness is greater than about 50 µm, the overall thickness of the pouch becomes large. Thus, the volume of the secondary battery may increase, and the energy density may be deteriorated. Particularly, according to an embodiment of the present invention, the ratio of thicknesses between the drawing assistance layer 1354 and the moisture barrier layer 1352 may be less than about 1:2.5. That is, a proportion of the drawing assistance layer 1354 to the thickness may increase more than that of the related art. However, when the thickness of the drawing assistance layer 1354 is excessively increased, the overall thickness of the pouch becomes large. Thus, the ratio of thickness may be greater than about 1:1.5 so as to prevent the overall thickness from becoming excessive. That is, the ratio of thickness may be about 1:1.5 to about 1:2.5.

FIG. 3 is a graph showing the iron and silicon contents in each of an alloy no. AA8079 aluminum alloy and an alloy no. AA8021 aluminum alloy.

The mechanical strength is enhanced when a large amount of iron is contained in the aluminum alloy, but the flexibility is enhanced when a small amount of iron is contained in the aluminum alloy. As illustrated in FIG. 3, the alloy no. AA8079 among the aluminum alloys includes about 0.6 wt % to about 1.2 wt % of iron and about 0.3 wt % or less of silicon. That is, when the moisture barrier layer 1352 is made of the alloy no. AA8079 aluminum alloy, a relatively small amount of iron is included, and thus, the flexibility may be enhanced. However, the strength may be deteriorated, and there may be a limitation on the formability.

On the other hand, as illustrated in FIG. 3, the alloy no. AA8021 among the aluminum alloys includes about 1.2 wt % to about 1.7 wt % of iron, and more particularly, about 1.3 wt % to about 1.7 wt % of iron and about 0.2 wt % or less of silicon. That is, when the moisture barrier layer 1352 is made of the alloy no. AA8021 aluminum alloy, a relatively large amount of iron is included, and thus, the tensile strength and elongation rate may be improved.

Meanwhile, when a tensile force is applied to a material, the relationship between the tensile strength and the elongation rate may be represented in a graph. Here, when the vertical axis of the graph represents the tensile strength and the horizontal axis represents the elongation rate, the area below the graph represents the toughness of the material. The toughness represents the ability to withstand fracture of a material. Thus, as the toughness of a material is higher, the material may be drawn as much as possible without being broken.

Thus, when the moisture barrier layer 1352 is made of the alloy no. AA8021 aluminum alloy, the tensile strength and elongation rate are improved. Thus, the toughness may be increased, and the formability may be enhanced.

FIG. 4 is a graph showing changes in a tensile strength Rm, an elongation rate, and a grain size according to the iron content in each of the alloy no. AA8079 aluminum alloy and the alloy no. AA8021 aluminum alloy, and FIG. 5 is an enlarged SEM image of grains of each of the alloy no. AA8079 aluminum alloy and the alloy no. AA8021 aluminum alloy.

As illustrated in FIG. 4, the tensile strength, the elongation rate, and the grain size are changed according to the iron content in the aluminum alloy. Specifically, the tensile strength and elongation rate are proportional to the iron content, and thus, the tensile strength and elongation rate increase as the iron content increases. On the contrary, the grain size is inversely proportional to the iron content, and thus, the grain size decreases as the iron content increases.

As described above, the alloy no. AA8079 among the aluminum alloys includes about 0.6 wt % to about 1.2 wt % of iron, and thus, the grain size is relatively large, for example, about 13 µm to about 21 µm as illustrated in FIG. 5. Thus, the internal stress is less dispersed when drawn, and the number of pin holes increases. Thus, the formability of the battery case 13 is deteriorated.

On the other hand, the alloy no. AA8021 among the aluminum alloys includes about 1.2 wt % to about 1.7 wt % of iron, and thus, the grain size is relatively small, for example, about 10 µm to about 13 µm as illustrated in FIG. 5. Thus, the internal stress may be more dispersed when drawn, and the number of pin holes decreases. Thus, the formability of the battery case 13 may be enhanced.

Thus, the aluminum alloy used to manufacture the moisture barrier layer 1352 according to an embodiment of the present invention may include about 1.2 wt % to about 1.7 wt % of iron, and more particularly, about 1.3 wt % to about 1.7 wt % of iron. Also, the aluminum alloy may include about 0.2 or less wt % of silicon. Also, the grain size may be about 10 µm to about 13 µm. That is, in an embodiment of the present invention, the aluminum alloy used to manufacture the moisture barrier layer 1352 may be the alloy no. AA8021.

FIG. 6 is an enlarged schematic view of a die edge 138 and an electrode tab 11 according to a comparative example of the present invention.

A cup portion 133 includes various types of edges. Specifically, the cup portion 133 includes a punch edge 139 formed corresponding to a pressing edge 221 of a punch 22 and a die edge 138 formed corresponding to a pressing edge 213 of a die 21. The punch edge 139 connects a plurality of outer walls 1333, which enclose the surroundings of the cup portion 133, to a bottom portion 1332. The die edge 138 connects the plurality of outer walls 1333 to a side portion 134. However, if the pressing edge of the die is not rounded, the pressing edge of the die is sharp. Thus, when a pouch film 135 is formed, stress is concentrated on the die edge of the cup portion, and a crack easily occurs.

To solve the above limitation, the pressing edge 213 of the die 21 is rounded. Thus, as illustrated in FIG. 6, the die edge 138 of the cup portion 133 is rounded, and the stress concentrated on the die edge 138 may be dispersed to some extent. However, if the cup portion is formed to have a specific depth or more, a crack may still occur at the pouch film 135 when a radius of curvature of the die edge of the cup portion is about 2 mm or less. Here, the specific depth may be about 7 mm when one cup portion 133 is formed and may be about 6.5 mm when two cup portions 133 are formed.

The die edge 138 is rounded to have a curved surface. The curved surface may have an entirely uniform curvature. However, the embodiment is not limited thereto, and the curved surface may have the entirely nonuniform curvature.

Thus, according to an embodiment of the present invention, the sealant layer 1351 may have the thickness of about 60 μm to about 100 μm, and more particularly, about 75 μm to about 85 μm, the moisture barrier layer 1352 may have the thickness of about 50 μm to about 80 μm, and particularly, about 55 μm to about 65 μm, and an aluminum alloy of the moisture barrier layer 1352 may be an alloy no. AA80XX series, particularly, an alloy no. AA8021. Accordingly, the formability of the moisture barrier layer 1352 may be enhanced. As illustrated in FIG. 6, even though the cup portion 133 is formed to have at least specific depth when the pouch film 135 is drawn, each of the outer walls 1333 of the cup portion 133 may become almost vertical, and radii R3 of curvature of the edges 138 and 139 of the cup portion 133 may also be reduced.

Also, according to another embodiment of the present invention, as a cup portion 133 is formed to have a specific depth or less when a pouch film 135 is drawn, an outer wall 1333 of the cup portion 133 may become almost vertical, and radii R3 of curvature of edges 138 and 139 of the cup portion 333 may also be reduced.

Specifically, the outer wall 1333 of the cup portion 133 is formed almost vertically such that an inclination angle from the bottom portion 1332 is about 90° to about 95°, preferably, about 90° to about 93°, and at least one of the edges 138 and 139 of the cup portion 133 is rounded at the curved surface such that the radius R3 of curvature is about 1 mm or less, and more particularly, about 0.7 mm or less. With the above configurations, it is possible to prevent a crack from occurring.

When the battery case 13 is manufactured as described above, the volume of an accommodation space 1331 increases compared to the prior art. Thus, the volume of an electrode assembly 10 accommodated inside the accommodation space 1331 may also increase, and the energy efficiency with respect to the volume of a secondary battery 1 may also increase. However, the manufacturing costs may not significantly increase, and the entire thickness of the pouch may not significantly increase even though the thickness of the sealant layer 1351 is not reduced. Also, the sealing durability may not be deteriorated. Moreover, the pouch-type battery case 13 and the pouch-type secondary battery 1 may have entirely sharp shapes, and thus, the secondary battery 1 may also have an excellent appearance and an enhanced commercial value.

However, when the outer wall 1333 of the cup portion 133 becomes almost vertical and the radii of curvature of the edges 138 and 139 of the cup portion 133 are reduced, there may be interference between the die edge 138 and the electrode tabs 11 as illustrated in FIG. 6. Specifically, each of the electrode tabs 11 protrude from a respective electrode and are stacked on one another, connected to each other, and then placed on the side portion 134. Here, the electrode tabs 11 are placed on a region from the die edge 138 to the side portion 134. As the radius R3 of curvature of the die edge 138 is reduced, the die edge 138 is further indented toward the inside of the cup portion 133, and the flexibility at the die edge 138 may be deteriorated. Accordingly, the distance between the die edge 138 and the electrode tabs 11 is also reduced, and the die edge 138 presses the electrode tab 11 thus, creating interference between the die edge 138 and the electrode tab 11. Particularly, as the number of the electrode tabs 11 increases, the collective thickness of the stacked electrode tabs 11 increases. Thus, the space between the electrode tabs 11 and the outer wall 1333 of the cup portion 133 becomes narrow. As a result, the die edge 138 may further press the electrode tab 11, and the power may not be smoothly supplied. Furthermore, the electrode tabs 11 may be cut off.

FIG. 7 is a partial plan view of a battery case 13 according to an embodiment of the present invention, and FIG. 8 is a partial plan view showing a state in which an electrode assembly 10 is inserted into a cup portion 133 of the battery case 13 according to an embodiment of the present invention.

According to embodiments of the present invention, the formability of a pouch film 135 is enhanced. Accordingly, the outer wall 1333 of the cup portion 133 becomes almost vertical, and radii R1 and R2 of curvature of the die edge 138 of the cup portion 133 are reduced. In this manner, it is possible to prevent the occurrence of interference between the die edge 138 and the electrode tabs 11.

To this end, a pouch-type battery case 13 according to an embodiment of the present invention includes: a cup portion 133 which accommodates therein an electrode assembly 10 formed by stacking an electrode and a separator; and a plurality of die edges 138 which connect an outer wall 1333 of the cup portion 133 to a side portion 134 extending from the outer wall 1333. At least one of die edges 138 includes: a first region 1381 rounded to have a first radius R1 of curvature (illustrated in FIG. 9); and a second region 1382 rounded to have a second radius R2 of curvature (illustrated in FIG. 10) that is less than or equal to the first radius R1 of curvature.

The electrode assembly 10, formed by alternatively stacking an electrode and a separator, may then be accommodates within the cup portion 133 to form the secondary battery 1.

As described above, the battery case 13 includes a plurality of outer walls 1333, which define and enclose an interior of the cup portion 133, and the side portion 134 which extends from the outer walls 1333. Also, the die edges 138 connect the plurality of outer walls 1333 to the side portion 134. According to an embodiment of the present invention, at least one die edge 138 is rounded at two different radii R1 and R2 of curvature. That is, as illustrated in FIG. 7, at least one die edge 138 includes the first region 1381 rounded at the first radius R1 of curvature and the second region 1382 rounded at the second radius R2 of curvature less than or equal to the first radius R1 of curvature. Here, the first radius R1 of curvature may be between about 1.7 mm and about 2.7 mm, and the second radius R2 of curvature may be about 1.2 mm or less, and preferably, about 0.7 mm or less. That is, the first radius R1 of curvature is about 1.5 times to about 4 times larger than the second radius R2 of curvature.

As illustrated in FIGS. 7 and 8, the first region 1381 is a region on which the electrode tab 11 protruding from one side of the electrode assembly 10 is placed. On the other hand, the second region 1382 is a region on which the electrode tab 11 is not placed. Thus, the first region 1381 is rounded at the relatively large first radius R1 of curvature, and the second region 1382 is rounded at the relatively small second radius R2 of curvature.

The width of the first region 1381 may correspond to the width of the electrode tab 11 so that the electrode tab 11 is stably placed on the first region 1381. Here, the width of the first region 1381 is equal to or slightly greater than the width of the electrode tab 11. If the width of the first region 1381 is less than the width of the electrode tab 11, then the electrode tab 11 may not be stably placed on the die edge 138.

Meanwhile, the die edges 138 are formed along the periphery of the outer walls 1333 of the cup portion 133, and thus, the number of die edges 138 are equal to the number of outer walls 1333. For example, as illustrated in FIG. 7, when the cup portion 133 has a quadrangular shape, four die edges 138 may be formed. However, the embodiment is not limited thereto, and the number of die edges 138 may be diversely changed according to the number of the outer walls 1333 of the cup portion 133.

Also, when the plurality of electrode tabs 11 protrude in different directions of the electrode assembly 10, the first region 1381 on which the electrode tabs 11 are placed may also be formed in each of different die edges 138. For example, as illustrated in FIG. 7, the first region 1381 may be formed in two opposite die edges 138. Here, the first region 1381 may be positioned generally at a central portion of the die edge 138, and the second region 1382 may be formed on each lateral side of the first region 1381. However, the embodiment is not limited thereto. For example, when the plurality of electrode tabs 11 protrude from the same side of the electrode assembly 10 in a side by side manner and in the same direction, a plurality of first regions 1381 may be formed in one die edge 138. Here, second regions 1382 may be formed between the plurality of first regions 1381.

Meanwhile, the first region 1381 and the second region 1382 are rounded at the different radii R1 and R2 of curvature, and thus, a stepped portion may be formed between the first region 1381 and the second region 1382. However, the embodiment is not limited thereto, and a connection region for connecting the first region 1381 to the second region 1382 may be formed so as to prevent the formation of the stepped portion. The connection region may also rounded. While the connection region extends from the first region 1381 to the second region 1382, the radius of curvature of the connection region may change gradually and continuously from the first radius R1 of curvature to the second radius R2 of curvature. Accordingly, the first region 1381 may be continuously connected to the second region 1382 without the stepped portion.

FIG. 9 is an enlarged schematic view of a first region 1381 of a die edge 138 and an electrode tab 11 according to an embodiment of the present invention, and FIG. 10 is an enlarged schematic view of a second region 1382 of the die edge 138 of a cup portion 133 and the electrode tab 11 according to an embodiment of the present invention.

As described above, the first region 1381 on which the electrode tab 11 is placed is rounded to have a relatively large first radius R1 of curvature. The first radius R1 of curvature may be between about 1.7 mm and about 2.7 mm. Thus, as illustrated in FIG. 9, the die edge 138 does not press the electrode tab 11, and therefore, interference between the die edge 138 and the electrode tab 11 does not occur in the first region 1381 on which the electrode tab 11 is placed.

On the other hand, the second region 1382 on which the electrode tab 11 is not placed is rounded at a relatively small second radius R2 of curvature. The second radius R2 of curvature may be about 1.2 mm or less, and preferably, about 0.7 mm or less. Thus, as illustrated in FIG. 10, the energy efficiency with respect to the volume of a secondary battery 1 is increased, and the pouch-type battery case 13 and the pouch-type secondary battery 1 may have entirely sharp shapes. Thus, the secondary battery 1 may also have an excellent appearance and an enhanced commercial value.

FIG. 11 is a schematic view of a forming apparatus 2 according to an embodiment of the present invention.

A forming apparatus 2 for forming a pouch film 135 according to an embodiment of the present invention includes: a die 21 which has a top surface, on which the pouch film 135 is placed, and includes at least one forming space 211 recessed inwardly from the top surface; and a punch 22 which is disposed above the forming space 211, and descends to press the pouch film 135 into the forming space 211, thereby forming the battery case. The die 21 includes a plurality of pressing edges 213 at a junction between the top surface and a sidewall defining the forming space 211. At least one pressing edge 213 includes: a third region 2131 (illustrated in FIG. 12) rounded to have a third radius of curvature; and a fourth region 2132 (illustrated in FIG. 12) rounded at a fourth radius of curvature less than or equal to the third radius of curvature.

When the battery case 13 is formed using the forming apparatus 2, only one cup portion 133 may be formed as described above. However, the embodiment is not limited thereto, and two neighboring cup portions 133 may be drawn. To this end, as illustrated in FIG. 11, two neighboring forming spaces 211 are formed in the die 21, and a partition wall 212 may be formed between the two neighboring forming spaces 211. When the punch 22 is inserted into the two forming spaces 211 and draws the pouch film 135, two cup portions 133 are respectively formed in a first case 131 and a second case 132 so as to correspond to the two forming spaces 211. A bridge 136 may also be formed together between the two cup portions 133 to correspond to the partition wall 212.

The bridge 136 may be a reference portion when the battery case 13 is subsequently folded. When the manufacturing of a secondary battery 1 is completed, the bridge 136 may form a folding portion (not shown) on one side of the secondary battery 1. Also, the first case 131 and the second case 132 are integrally connected to each other along the folding portion, and thus, the number of sides portion 134 required to be sealed during a subsequent sealing process is be reduced. Thus, the speed at which the secondary battery 1 is manufactured may be enhanced. As the width of the folding portion is reduced, a space between an outer wall 1333 of the cup portion 133 and an electrode assembly 10 is also reduced. Thus, the entire volume of the secondary battery 1 is reduced, and the energy density to the volume may increase.

The width of the folding portion is proportional to the thickness of the bridge 136, and the bridge 136 is formed corresponding to the partition wall 212. Thus, the thickness of the bridge 136 is proportional to the thickness of the partition wall 212. Thus, it is desirable to minimize the thickness of the bridge 136 when the pouch film 135 is formed. To this end, it is desirable to minimize the thickness of the partition wall 212. However, when the partition wall 212 is formed to have an excessively high height in a thin state, the partition wall 212 may be damaged during the drawing process. Particularly, a die 21 according to the related art included a bottom, which made it difficult to properly discharge a gas disposed within a space between the pouch film 135 and the forming space 211 when the pouch film 135 is drawn by the punch 22. For this reason, recently, the bottom is removed from the die 21, and thus, the gas present in the space between the pouch film 135 and the forming space 211 may be easily discharged. However, the partition wall 212 is formed to have the excessively high height. Thus, according to an embodiment of the present invention, as illustrated in FIG. 11, an upper portion of the partition wall 212 maintains the minimized thickness, and a reinforcement portion 2121 having the thickness greater than that of the partition wall 212 may be formed in a lower portion of the partition wall 212. The reinforcement portion 2121 may be formed at a position below a depth of the cup portion 133 which is to be formed in the battery case 13, and at the same time, may be formed at a position at which the partition wall 212 is not damaged. The accurate position of the reinforcement portion 2121 may be experimentally determined according to the thickness of the partition wall 212, the material of the partition wall 212, the pressure of the punch 22, and the depth of the cup portion 133 to be formed.

However, the embodiment is not limited thereto, and the thickness of the partition wall 212 may increase gradually toward the lower portion. That is, at least a portion of the cross-section of the partition wall 212 may have an approximately triangular shape, and an inner wall of the partition wall 212 defining the forming space 211 may be inclined. The preferred inclination of the inner wall may be experimentally determined according to the thickness of the upper portion of the partition wall 212, the material of the partition wall 212, the pressure of the punch 22, and the depth of the cup portion 133 to be formed. Accordingly, the strength of the partition wall 212 increases, and thus, it is possible to prevent the partition wall 212 from being damaged during the drawing process.

FIG. 12 is an enlarged view of a portion of a die 21 according to an embodiment of the present invention.

According to embodiments of the present invention, at least one die edge 138 of the pouch-type battery case 13 includes the first region 1381 rounded at the first radius R1 of curvature and the second region 1382 rounded at the second radius R2 of curvature less than or equal to the first radius R1 of curvature.

Also, in order to manufacture the battery case 13, the die 21 according to embodiments of the present invention includes a plurality of pressing edges 213 formed at a junction between the top surface of the die and the sidewall defining the forming space 211. At least one pressing edge 213 includes a third region 2131 rounded at a third radius of curvature and a fourth region 2132 rounded at a fourth radius of curvature less than or equal to the third radius of curvature.

To form the battery case 13, a pouch film 135 is placed on the top surface of the die 21 while covering the forming space 211, and the punch 22 is descended to press the pouch film 135 into the forming space 211. Through this, the cup portion 133 is formed, and the pouch-type battery case 13 is manufactured. Here, the die edges 138 of the pouch-type battery case 13 are formed to correspond the plurality of pressing edges 213 of the die 21.

More specifically, the third region 2131 of the pressing edge 213 corresponds to the first region 1381 of the battery case 13. Also, the first radius R1 of curvature of the first region 1381 may be between about 1.7 mm and about 2.7 mm, and thus, the third radius of curvature of the third region 2131 may be less than the first radius R1 of curvature by about 0.2 mm, which is the approximate thickness of the pouch film 135. Thus, the third radius of curvature may be between about 1.5 mm and about 2.5 mm. Also, the fourth region 2132 of the pressing edge 213 corresponds to the second region 1382 of the battery case 13. Furthermore, the second radius R2 of curvature of the second region 1382 may be about 1.2 mm or less, and preferably, about 0.7 mm or less. Thus, the fourth radius of curvature of the fourth region 2132 may be less than the second radius R2 of curvature by about 0.2 mm, which is the approximate thickness of the pouch film 135. Thus, the fourth radius of curvature may be about 1.0 mm or less, and preferably, about 0.5 mm or less.

The pressing edge 213 of the die 21 corresponds to the die edge 138 of the battery case 13, and the forming space 211 of the die 21 corresponds to the cup portion 133 of the battery case 13. As previously described, the pressing edge 213 is formed at a junction between the upper surface of the die 21 and the sidewalls defining the periphery of the forming space 211. Accordingly, when the forming space 211 has a quadrangular shape, four pressing edges 213 may be formed.

Also, the third region 2131 may be formed in one or more different pressing edges 213. For example, the third region 2131 may be formed in two opposite pressing edges 213. Here, the third region 2131 may be positioned at an approximately central portion of the pressing edge 213, and the fourth region 2132 may be formed on both sides of the third region 2131. However, the embodiment is not limited thereto. A plurality of third regions 2131 may be formed in one pressing edge 213, and the fourth region 2132 may be formed between the third regions 2131.

Meanwhile, the third region 2131 and the fourth region 2132 are rounded at the different radii of curvature, and thus, a stepped portion may be formed between the third region 2131 and the fourth region 2132. However, the embodiment is not limited thereto, and a connection region for connecting the third region 2131 to the fourth region 2132 may be formed so as to prevent the formation of the stepped portion. The connection region is also rounded. While the connection region extends from the third region 2131 to the fourth region 2132, the radius of curvature of the connection region may change gradually and continuously from the third radius of curvature to the fourth radius of curvature. Accordingly, the third region 2131 may be continuously connected to the fourth region 2132 without the stepped portion.

A battery case 413 according to another embodiment of the present invention includes a cup portion 533 and a plurality of die edges.

The cup portion 533 may be configured to accommodate an electrode assembly formed by stacking an electrode and a separator. The cup portion 533 may include a first cup portion 533-1 provided in a first case and a second cup portion 533-2 provided in a second case.

The die edge is formed at a junction of an outer wall 5333 of the cup portion 533 and a side portion 534 extending from the outer wall 5333. Since a plurality of outer walls 5333 are present in the cup portion 533, a plurality of die edges may be provided.

Here, the plurality of die edges may include a first region 5381 and a second region 5382. The first region 5381 may be a region which is rounded at a first radius r1 of curvature and at which an electrode tab extending from the electrode is positioned (for convenience of understanding, the width of the first region is illustrated as L1 in FIG. 13).

The second region 5382 may be a region other than the first region 5381. Also, the second region 5382 may be a region which is rounded at one or more second radii r2, r3, and r4 of curvature less than or equal to the first radius r1 of curvature.

In the battery case 413, the second region 5382 may be divided into an inner region 5383 and an outer region 5384 with respect to the first region 5381. That is, for example, when the inner region 5383 is on one side of the first region 5381, the outer region 5384 may be on the other side of the first region 5381.

The cup portion 533 may include the first cup portion 533-1 and the second cup portion 533-2 which are formed to accommodate the electrode assembly through folding. Also, a bridge 536 may be formed between the first cup portion 533-1 and the second cup portion 533-2 to connect the first cup portion 533-1 to the second cup portion 533-2. Here, with respect to the first region 5381, the inner region 5383 may be closer to the bridge 536 than the outer region 5384.

In the battery case 413, the radius r2 of curvature of the inner region 5383 may be different than the radii r3 and r4 of curvature in the outer region 5384.

According to the related art, the radius of curvature of a die edge is determined irrespective of the radius of curvature of the bridge, and in particular, the same radius of curvature was applied to all of an inner regions and outer regions. Thus, there is often wrinkling in a corner portion (particularly, in a corner portion of the die edge) of a pouch-type battery case. The related pouch-type battery cases are also susceptible to a whitening phenomenon and insulation breakdown in a side folding portion.

However, in the battery case 413, the radius r2 of curvature in the inner region 5383 may be set to differ from the radii r3 and r4 of curvature in the outer region 5384 *e*. Thus, it is possible to adjust the radius of curvature so as to prevent the occurrence of wrinkling in the corner portion of the pouch-type battery case 413. Also, the numerical ranges, which are capable of preventing the whitening phenomenon and removing the risk of insulation breakdown, may be appropriately set in the side folding portion, and as such, the pouch-type secondary battery has improved quality.

More specifically, in the battery case 413, the first region 5381 may be formed in each of a first die edge 5380-1 and a second die edge opposite the first die edge 5380-1. FIG. 13 illustrates the first die edge 5380-1, and the first region 5381 formed in the first die edge 5380-1. However, the second die edge is omitted in the drawing for convenience of illustration. That is, the second die edge, which is not shown in FIG. 13, and the first die edge 5380-1, which is shown in FIG. 13, are symmetric to one another with respect to an axis extending perpendicular to the longitudinal direction of the battery case 413.

In the battery case 413, a radius b1 of curvature in the bridge 536 may be equal to the radius r2 of curvature in the inner region 5383. Accordingly, in the present application, a region connecting the bridge 536 to the inner region 5383 may have the same curvature. Thus, it is possible to prevent the occurrence of wrinkling in the region connecting the bridge 536 to the inner region 5383, that is, in an inner corner portion of the battery case 413.

Specifically, the radius b1 of curvature in the bridge 536 and the radius r2 of curvature in the inner region 5383 may be between about 0.3 mm and about 0.7 mm. That is, the radius b1 of curvature in the bridge 536 and the radius r2 of curvature in the inner region 5383 may have the same value within a range from about 0.3 mm to about 0.7 mm. Also, the radius b1 of curvature in the bridge 536 and the radius r2 of curvature in the inner region 5383 may be about 0.45 mm to about 0.55 mm. That is, in this case, the radius b1 of curvature in the bridge 536 and the radius r2 of curvature in the inner region 5383 may have the same value within a range from about 0.45 mm to about 0.55 mm. More specifically, both the radius b1 of curvature in the bridge 536 and the radius r2 of curvature in the inner region 5383 may be about 0.5 mm.

When the radius of curvature in the bridge 536 has a small value within the numerical range described above, the bridge 536 may be tautly spread as the battery case 413 folds. Thus, unnecessary protruding portions may be removed from the exterior of the battery case 413, and the energy density may be enhanced.

Meanwhile, in the battery case 413, the outer region 5384 may include a main outer region 5384-1 and a connection outer region 5384-2. The main outer region 5384-1 may be a region on a third die edge 5380-3 opposite the bridge 536. Here, the third die edge 5380-3 may be a die edge that connects the first die edge 5380-1 to the second die edge. Also, the main outer region 5384-1 of the outer region 5384 may be a region formed in the third die edge 5380-3. The connection outer region 5384-2 may be a region that connects the main outer region 5384-1 to the first region 5381. For convenience of understanding, the dimension of the connection outer region 5384-2 is illustrated as L2 in FIG. 13.

Here, the radius r3 of curvature in the main outer region 5384-1 may be equal to the radius r4 of curvature in the connection outer region 5384-2. Also, the radius r3 of curvature in the main outer region 5384-1 and the radius r4 of curvature in the connection outer region 5384-2 may be about 1 mm or more and equal to each other.

After the battery case 413 is folded about the bridge 536, the side portion 534, which is connected to the main outer region 5384-1 of the first cup portion 533-1, is folded into contact with the side portion 534, which is connected to the main outer region 5384-1 of the second cup portion 533-2, so as to achieve a neat appearance. However, when the radius of curvature of the main outer region 5384-1, is less than about 1 mm, a whitening phenomenon may occur (the whitening phenomenon means that the color of the pouch turns white just before a crack occurs in the pouch). Also, insulation failure may occur. Accordingly, in the battery case 413, the radius r3 of curvature in the main outer region 5384-1 is about 1 mm or greater. Thus, it is possible to prevent the whitening phenomenon, the insulation failure, or the like.

Also, the radius r3 of curvature in the main outer region 5384-1, which is about 1 mm or more, and the radius r4 of curvature in the connection outer region 5384-2 may be equal to each other. When these two radii of curvature are equal to each other, a region connecting the main outer region 5384-1 to the connection outer region 5384-2 may have the same curvature. Thus, it is possible to prevent the occurrence of wrinkling in the region connecting the main outer region 5384-1 to the connection outer region 5384-2, that is, in an outer corner portion of the battery case 413. In this case, the radii r3 and r4 of curvature in the outer region 5384 may be greater than the radius r2 of curvature in the inner region 5383.

Also, in the battery case 413, the first region 5381 may be formed to have a greater radius of curvature than the second region 5382. That is, the radius r1 of curvature of the first region 5381 may be greater than all of the radius r2 of curvature in the inner region 5383, the radius r3 of curvature in the main outer region 5384-1, and the radius r4 of curvature in the connection outer region 5384-2.

Specifically, the radius r1 of curvature in the first region 5381 may be about 1.5 mm to about 2.5 mm, and more specifically, about 2.0 mm. When the radius of curvature in the first region 5381 has a value within the numerical range described above, the occurrence of interference between the die edge and the electrode tab as described above does not occur.

Meanwhile, when using the battery case 413 described above, a secondary battery may be manufactured which prevents the occurrence of wrinkling in the corner portion, eliminates the whitening phenomenon and reduces the risk of insulation breakdown in the side folding portion.

Specifically, a secondary battery may be manufactured by accommodating an electrode assembly, formed by stacking an electrode and a separator, into the battery case 413.

The first region 5381 may be a region which is rounded to have the first radius r1 of curvature and at which the electrode tab extending from the electrode is positioned. The second region 5382 is a region, which is other than the first region 5381 and rounded at one or more second radii r2, r3, and r4 of curvature less than or equal to the first radius r1 of curvature.

Also, the second region 5382 may be divided into the inner region 5383 and the outer region 5384 with respect to the first region 5381, and the radius r2 of curvature in the inner region 5383 may be different from the radii r3 and r4 of curvature in the outer region 5384.

FIG. 14 is a perspective view of a forming apparatus for manufacturing a battery case according to another embodiment of the present invention.

Hereinafter, a battery case forming apparatus for manufacturing a battery case 413 according to another embodiment of the present invention will be described.

The battery case forming apparatus may include a die and punch (refer to FIG. 11 for the structures and principles of the die and punch). Referring to FIG. 14, a die 421 may have a top surface 634, on which a pouch film is placed, and define at least one forming space 633 recessed inward from the top surface 634. The punch may be disposed above the forming space 633, and configured to descend to press the pouch film into the forming space 633, thereby forming the pouch-type battery case.

FIG. 14 is a view illustrating only the die 421 among the punch and die for convenience of illustration. Referring to FIG. 14, in the battery case forming apparatus for manufacturing the battery case 413, the die 421 may include a plurality of pressing edges at a junction of the top surface 634 and a sidewall defining the forming space 633. The plurality of pressing edges may include a third region 6381 and a fourth region 6382.

The third region 6381 may be a region which is rounded at a third radius C1 of curvature to form the first region 5381 described above. The fourth region 6382 is a region, which is other than the third region 6381 and rounded at one or more fourth radii C2, C3, and C4 of curvature less than or equal to the third radius C1 of curvature. The fourth region 6382 forms the second region 5382 described above.

Here, the fourth region 6382 may be divided into a die inner region 6383 and a die outer region 6384 with respect to the third region 6381. That is, for example, the die inner region 6383 is on one side of the third region 6381, and the die outer region 6384 is on the other side of the third region 6381.

The fourth region 6382 is divided into the die inner region 6383 and the die outer region 6384 with respect to the third region 6381. Here, the radius C2 of curvature in the die inner region 6383 may be different from the radii C3 and C4 of curvature in the die outer region 6384. As the radius C2 of curvature in the die inner region 6383 is different from the radii C3 and C4 of curvature in the die outer region 6384, the radius r2 of curvature in the inner region of the battery case may be different from the radii r3 and r4 of curvature in the outer region of the battery case as described above.

More specifically, the radii C3 and C4 of curvature in the die outer region 6384 may be greater than the radius C2 of curvature in the die inner region 6383. Accordingly, the radii r3 and r4 of curvature in the outer region of the battery case may be greater than the radius r2 of curvature in the inner region of the battery case.

This is because the radius r2 of curvature in the inner region of the battery case are formed by the radius C2 of curvature of the die inner region 6383, and the radii r3 and r4 of curvature in the outer region of the battery case are formed by the radii C3 and C4 of curvature in the die outer region 6384.

The forming space 633 of the die 421 may include a first forming space 633-1 and a second forming space 633-2 to form the cup portion. The first forming space 633-1 may form the first cup portion 533-1, and the second forming space 633-2 may form the second cup portion 533-2. Also, a die bridge 636 may be formed between the first forming space 633-1 and the second forming space 633-2 to connect the first forming space 633-1 to the second forming space 633-2. Here, the die bridge 636 may form the bridge 536 of the battery case.

Also, with respect to the third region 6381, the die inner region 6383 may be closer to the die bridge 636 than the die outer region 6384.

Also, in the forming apparatus for manufacturing the battery case, the third region 6381 may be formed in each of a first pressing edge 6380-1 and a second pressing edge opposite the first pressing edge 6380-1. FIG. 14 illustrates the first pressing edge 6380-1, and the third region 6381 formed in the first pressing edge 6380-1. However, the second pressing edge is omitted in the drawing for convenience of illustration. That is, the second pressing edge, which is not shown in FIG. 14, and the first pressing edge 6380-1, which is shown in FIG. 14, are symmetric to one another with respect to an axis extending perpendicular to the longitudinal direction of the die.

In the battery case forming apparatus for manufacturing the battery, a radius S1 of curvature in the die bridge 636 may be equal to the radius C2 of curvature in the die inner region 6383. Accordingly, in the present application, a region connecting the die bridge 636 to the die inner region 6383 may have the same curvature. Thus, wrinkling does not occur in the corner region, connecting the bridge 536 to the inner region 5383, of the battery case formed by the die of the present invention.

Specifically, the radius S1 of curvature in the die bridge 636 and the radius C2 of curvature in the die inner region 6383 may be about 0.3 mm to about 0.7 mm. That is, the radius S1 of curvature in the die bridge 636 and the radius C2 of curvature in the die inner region 6383 may have the same value and may be within a range from about 0.3 mm to about 0.7 mm. Also, the radius S1 of curvature in the die bridge 636 and the radius C2 of curvature in the die inner region 6383 may be about 0.45 mm to about 0.55 mm. That is, in this case, the radius S1 of curvature in the bridge 636 and the radius C2 of curvature in the die inner region 6383 may have the same value within a range from about 0.45 mm to about 0.55 mm. More specifically, both the radius S1 of curvature in the die bridge 636 and the radius C2 of curvature in the die inner region 6383 may be about 0.5 mm.

When the radius of curvature in the die bridge 636 has a small value within the numerical range described above, the bridge 536 of the battery case may also have a small curvature, and accordingly, the bridge 536 may be tautly spread. Thus, unnecessary protruding portions may be removed from the exterior of the battery case, and energy density may be enhanced.

Meanwhile, in the forming apparatus for manufacturing the battery case 413, the die outer region 6384 may include a main die outer region 6384-1 and a connection die outer region 6384-2. The main die outer region 6384-1 may be a region on a third pressing edge 6380-3 opposite the die bridge 636. Here, the third pressing edge 6380-3 is a pressing edge that connects the first pressing edge 6380-1 to the second pressing edge.

That is, the main die outer region 6384-1 of the die outer region 6384 may be a region formed in the third pressing edge 6380-3. Also, the connection die outer region 6384-2 may be a region that connects the main die outer region 6384-1 to the third region 6381.

Here, the radius C3 of curvature in the main die outer region 6384-1 may be equal to the radius C4 of curvature in the connection die outer region 6384-2. Also, the radius C3 of curvature in the main die outer region 6384-1 and the radius C4 of curvature in the connection die outer region 6384-2 may be about 1 mm or greater and equal to each other.

Accordingly, in the battery case 413, the radius r3 of curvature in the main outer region 5384-1 and the radius r4 of curvature in the connection outer region 5384-2 may be about 1 mm or greater. When the radius r3 of curvature in the main outer region is about 1 mm or greater, it is possible to prevent the whitening phenomenon, the insulation failure, or the like.

Also, because the radius C3 of curvature in the main die outer region 6384-1 and the radius C4 of curvature in the connection die outer region 6384-2 are equal to each other, the radius r3 of curvature in the main outer region 5384-1 and the radius r4 of curvature in the connection outer region 5384-2 are formed to be equal to each other. When these two radii of curvature are equal to each other, the occurrence of wrinkling is prevented in the region connecting the main outer region 5384-1 to the connection outer region 5384-2, that is, in the outer corner portion of the battery case 413.

As described above, the forming apparatus for manufacturing the battery case may also prevent the occurrence of wrinkling in the corner portion of the battery case, reduce the whitening phenomenon and reduce the risk of insulation breakdown in the side folding portion.

Also, the third region 6381 may be formed to have a greater radius of curvature than the fourth region 6382. That is, the radius C1 of curvature of the third region 6381 may be greater than all of the radius C2 of curvature in the die inner region 6383, the radius C3 of curvature in the main die outer region 6384-1, and the radius C4 of curvature in the connection die outer region 6384-2.

Specifically, the radius C1 of curvature in the third region 6381 may be about 1.5 mm to about 2.5 mm, and more specifically, about 2.0 mm. When the radius of curvature in the third region 6381 has a value within the numerical range described above, the first region 5381 in the battery case 413 may be formed to have a value corresponding thereto.

Accordingly, it is possible to prevent the occurrence of interference between the die edge and the electrode tab as described above.

The embodiments of the present invention may have at least the following effects.

The first region of the die edges, on which the electrode tab is placed, is rounded at the relatively large first radius of curvature, and the second region, on which the electrode tab is not placed, is rounded at the relatively small second radius of curvature. Thus, the occurrence of interference between the die edge and the electrode tab may be prevented, even if the outer wall of the cup portion becomes almost vertical and the radius of curvature of the die edge of the cup portion is reduced.

Also, the occurrence of wrinkling in the corner portion of the pouch-type battery case is prevented. In the side folding portion, the whitening phenomenon may be eliminated, and the risk of insulation breakdown may be reduced.

The effects according to the present invention are not limited to those exemplified above, and more various effects are included in the present specification.

Those with ordinary skill in the technical field to which the present invention pertains will understand that the present invention may be implemented in other specific forms without changing the technical idea or essential features. Therefore, the above-described embodiments are to be considered illustrative and not restrictive to all aspects. The scope of the present invention is defined by the appended claims rather than the foregoing detailed description, and various modifications derived from the meaning and scope of the claims and the equivalent concepts thereof should be interpreted as being included in the scope of the present invention.

What is claimed is:

1. A pouch-type battery case comprising:
a pouch film defining a first cup configured to accommodate an electrode assembly, a side portion at least partially surrounding the first cup, and at least one die edge arranged at a junction of the side portion and a wall of the first cup,
wherein the at least one die edge comprises:
a first rounded region defining a first radius of curvature, the first rounded region arranged to receive an electrode tab extending from the electrode assembly; and
a second rounded region defining one or more second radii of curvature, the one or more second radii of curvature being less than the first radius of curvature,
wherein the second rounded region includes an inner region and an outer region with respect to the first rounded region, and
a radius of curvature of the inner region is different from a radii of curvature of the outer region.

2. The pouch-type battery case of claim 1, wherein the pouch film further comprises a second cup, and a bridge formed between the first cup and the second cup, the first and second cups configured to collectively accommodate the electrode assembly,
wherein the at least one die edge includes a first die edge and a second die edge provided opposite the first cup from the first die edge, the first and second die edges extending in a direction transverse to a direction in which the bridge extends, and
wherein the first rounded region is formed in each of the first and second die edges.

3. The pouch-type battery case of claim 2, wherein the inner region is closer to the bridge than the outer region.

4. The pouch-type battery case of claim 3, wherein the radii of curvature of the outer region are greater than the radius of curvature of the inner region.

5. The pouch-type battery case of claim 3, wherein the bridge defines a radius of curvature equal to the radius of curvature of the inner region.

6. The pouch-type battery case of claim 5, wherein the radius of curvature of the bridge is between about 0.3 mm and about 0.7 mm.

7. The pouch-type battery case of claim 5, wherein the radius of curvature of the bridge is between about 0.45 mm and about 0.55 mm.

8. The pouch-type battery case of claim 3, wherein the outer region comprises a main outer region on a third die edge extending between the first edge and the second die edge, and a connection outer region between the main outer region and the first rounded region, and
wherein a radius of curvature of the main outer region is equal to a radius of curvature of the connection outer region.

9. The pouch-type battery case of claim 8, wherein the radius of curvature of the main outer region is approximately equal to or greater than 1 mm, and
the radius of curvature of the first rounded region is between about 1.5 mm and about 2.5 mm.

10. A battery case forming apparatus for manufacturing the pouch-type battery case of claim 1, the battery case forming apparatus comprising:
a die having a top surface, on which the pouch film is configured to be placed, the die defining at least one forming space recessed inwardly relative to the top surface; and
a punch disposed above the forming space and arranged to descend relative to the die to punch the pouch film into the forming space,
wherein the die comprises a plurality of pressing edges arranged at a junction of a wall defining the forming space and the top surface of the die,
wherein the plurality of pressing edges comprise:
a third rounded region having a third radius of curvature, the third rounded region arranged to form the first rounded region; and
a fourth rounded region having one or more fourth radii of curvature less than or equal to the third radius of curvature,
wherein the fourth rounded region includes a die inner region and a die outer region with respect to the third rounded region, and
a radius of curvature of the die inner region is different from a radii of curvature of the die outer region.

11. The battery case forming apparatus of claim 10, wherein the at least one forming space comprises a first forming space and a second forming space,
wherein the die includes a die bridge formed between the first forming space and the second forming space, and
wherein the plurality of pressing edges includes a first pressing edge and a second pressing edge arranged opposite the at least one forming space from the first pressing edge, the first and second pressing edges defining the third region.

12. The battery case forming apparatus of claim 11, wherein the die inner region is closer to the die bridge than the die outer region.

13. The battery case forming apparatus of claim 12, wherein the radii of curvature of the die outer region are greater than the radius of curvature of the die inner region.

14. The battery case forming apparatus of claim 12, wherein the die bridge defines a radius of curvature equal to the radius of curvature of the die inner region.

15. The battery case forming apparatus of claim 14, wherein the radius of curvature of the die bridge is between about 0.3 mm and about 0.7 mm.

16. The battery case forming apparatus of claim 14, wherein the radius of curvature of the die bridge is between about 0.45 mm and about 0.55 mm.

17. The battery case forming apparatus of claim 12, wherein the die outer region comprises a main die outer region on a third pressing edge extending between the first pressing edge and the second pressing edge, and a connection die outer region between the main die outer region and the third region, and
wherein a radius of curvature of the main die outer region is equal to a radius of curvature of the connection die outer region.

18. The battery case forming apparatus of claim 17, wherein the radius of curvature of the main die outer region is equal to or greater than approximately 1 mm, and
the radius of curvature of the third region is between about 1.5 mm and about 2.5 mm.

19. A pouch-type secondary battery comprising:
an electrode assembly formed by stacking electrodes and separators, each electrode having electrode tabs; and
a battery case comprising a cup accommodating the electrode assembly, a side portion surrounding the cup, and a plurality of die edges arranged at a junction of the side portion and a wall of the cup,
wherein one of the plurality of die edges include:
a first rounded region defining a first radius of curvature for receiving the electrode tabs; and
a second rounded region defining one or more second radii of curvature less than the first radius of curvature,
wherein the second rounded region includes an inner region and an outer region with respect to the first rounded region, and
a radius of curvature of the inner region is different than the radii of curvature of the outer region.

* * * * *